US011016758B2

(12) United States Patent
Yamamoto et al.

(10) Patent No.: US 11,016,758 B2
(45) Date of Patent: May 25, 2021

(54) ANALYSIS SOFTWARE MANAGING SYSTEM AND ANALYSIS SOFTWARE MANAGING METHOD

(71) Applicant: HITACHI, LTD., Tokyo (JP)

(72) Inventors: Hidenori Yamamoto, Tokyo (JP); Takeshi Handa, Tokyo (JP); Yuko Yamashita, Tokyo (JP); Kenji Kawasaki, Tokyo (JP); Syuuichirou Sakikawa, Tokyo (JP); Takashi Tsuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 90 days.

(21) Appl. No.: 16/331,573

(22) PCT Filed: Nov. 29, 2017

(86) PCT No.: PCT/JP2017/042813
§ 371 (c)(1),
(2) Date: Mar. 8, 2019

(87) PCT Pub. No.: WO2018/159042
PCT Pub. Date: Sep. 7, 2018

(65) Prior Publication Data
US 2019/0213002 A1 Jul. 11, 2019

(30) Foreign Application Priority Data
Mar. 2, 2017 (JP) .............................. JP2017-038953

(51) Int. Cl.
*G06F 8/70* (2018.01)
*G06Q 10/06* (2012.01)
*G16Z 99/00* (2019.01)

(52) U.S. Cl.
CPC ............... *G06F 8/70* (2013.01); *G06Q 10/06* (2013.01); *G06Q 10/067* (2013.01); *G16Z 99/00* (2019.02)

(58) Field of Classification Search
CPC .......... G06F 8/70; G06Q 10/06; G06Q 10/10; G06Q 10/067; G06Q 10/063; G16Z 99/00
See application file for complete search history.

(56) References Cited

U.S. PATENT DOCUMENTS 7,333,866 B2 * 2/2008 Knight .................. G06Q 10/06
700/96
8,762,433 B1 * 6/2014 Lam ...................... G06F 16/178
707/825

(Continued)

FOREIGN PATENT DOCUMENTS

JP 2010-237900 A 10/2010
JP 2016-029516 A 3/2016
WO 2016/013280 A1 1/2016

OTHER PUBLICATIONS

International Search Report of PCT/JP2017/042813 dated Mar. 6, 2018.

*Primary Examiner* — Marina Lee
(74) *Attorney, Agent, or Firm* — Mattingly & Malur, PC

(57) ABSTRACT

Proposal of data analysis components is enabled to be performed irrespective of the quantity of an implementation history of data analysis, and thus efficiency and cost reduction of production of software for data analysis are promoted. A data utilization platform server 101 is configured to includes a arithmetic device 112 which executes processing of generating analysis relationship information prescribing linkage between analysis target data and an analysis component executing analysis processing for the analysis target table on the basis of a relationship among a plurality pieces of the analysis target data collected from a plurality (Continued)

of predetermined systems; and processing of specifying a combination of a plurality of the analysis components available for predetermined data designated as an analysis target by a user on the basis of the analysis relationship information.

12 Claims, 34 Drawing Sheets

(56) References Cited

U.S. PATENT DOCUMENTS

| | | | |
|---|---|---|---|
| 9,563,652 B2* | 2/2017 | Morimoto | G06F 16/285 |
| 2004/0236655 A1* | 11/2004 | Scumniotales | G06Q 10/10 |
| | | | 705/36 R |
| 2008/0281849 A1* | 11/2008 | Mineno | G06F 16/258 |
| 2012/0185464 A1* | 7/2012 | Kuroda | G06F 16/254 |
| | | | 707/722 |
| 2013/0132366 A1* | 5/2013 | Pieper | G06F 16/951 |
| | | | 707/710 |
| 2013/0262525 A1* | 10/2013 | Burda | G06F 16/254 |
| | | | 707/803 |
| 2014/0188785 A1* | 7/2014 | Asai | G06F 16/2465 |
| | | | 707/602 |
| 2016/0004757 A1* | 1/2016 | Tsuchida | G06F 16/283 |
| | | | 707/602 |
| 2016/0292197 A1* | 10/2016 | Morimoto | G06F 16/285 |
| 2019/0213002 A1* | 7/2019 | Yamamoto | G16Z 99/00 |

* cited by examiner

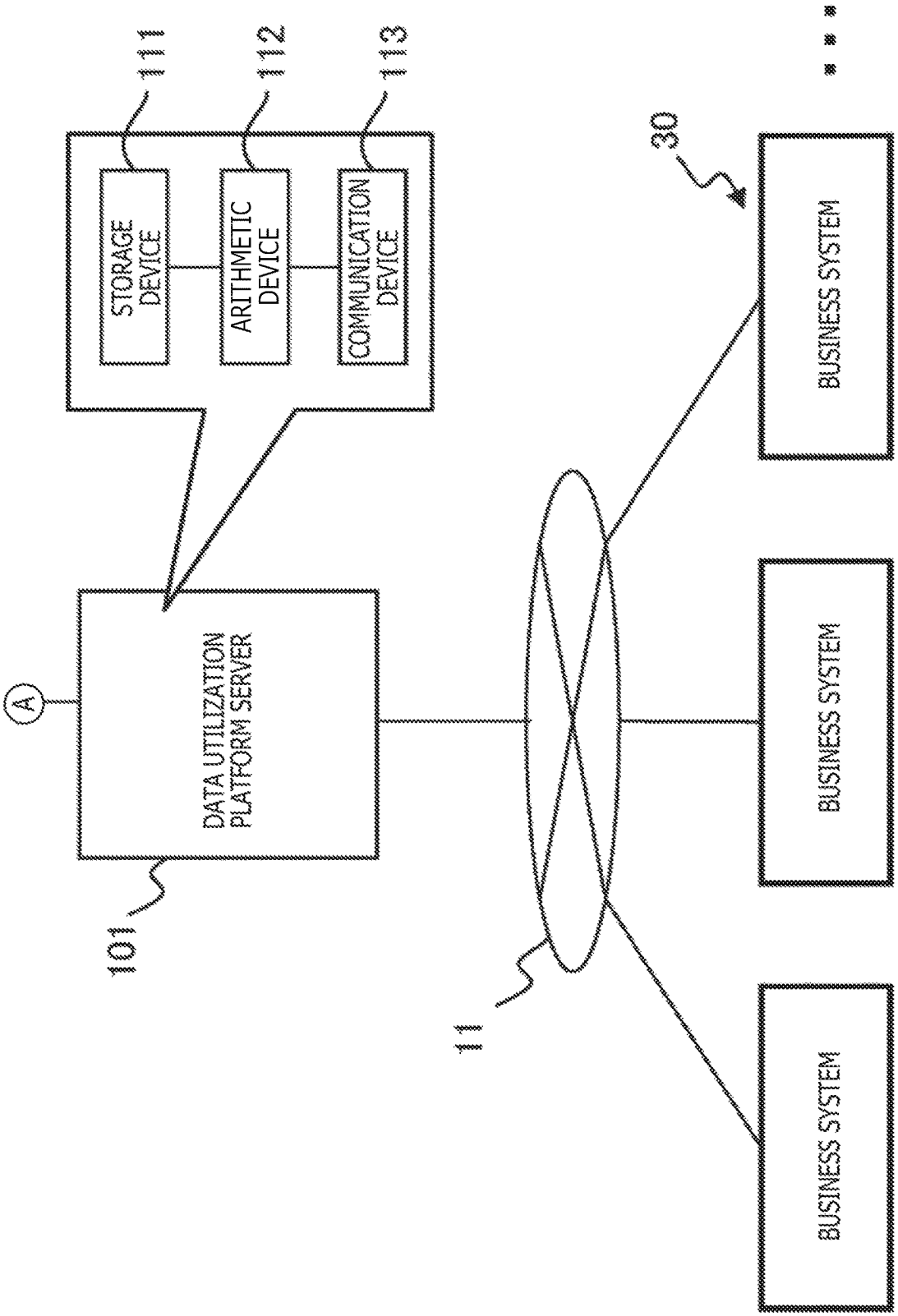

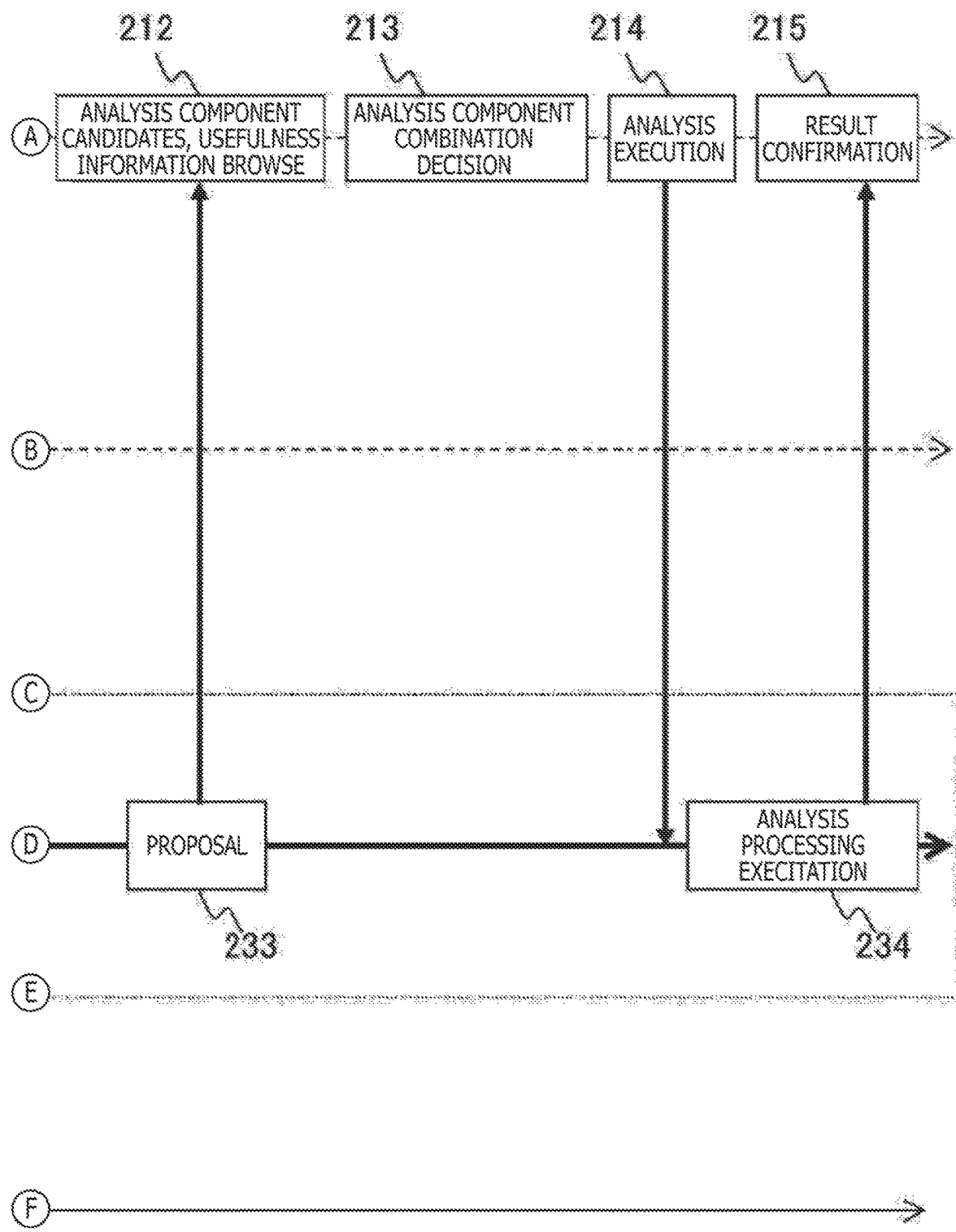

FIG. 5A

| 501 | | | | | |
|---|---|---|---|---|---|
| | LINKAGE IDENTIFICATION INFORMATION (511) | TARGET DATA IDENTIFICATION INFORMATION (512) | DATA MATCHING LOGIC IDENTIFICATION INFORMATION (513) | WEIGHT (514) | DATE OF UPDATING (515) |
| | 1 | Data A | DataLogic 1 | 1 | 16/2/22 10:00:00 |
| | 2 | Data A | DataLogic 2 | 3 | 16/3/31 10:00:00 |
| | 3 | Data B | DataLogic 2 | 3 | 16/3/31 10:00:00 |
| | ... | ... | ... | ... | ... |

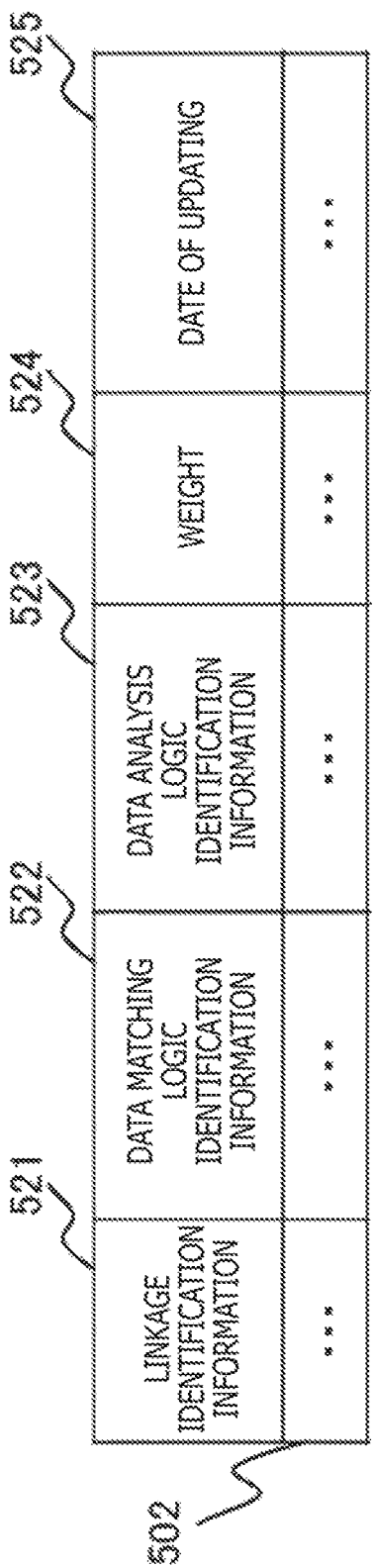

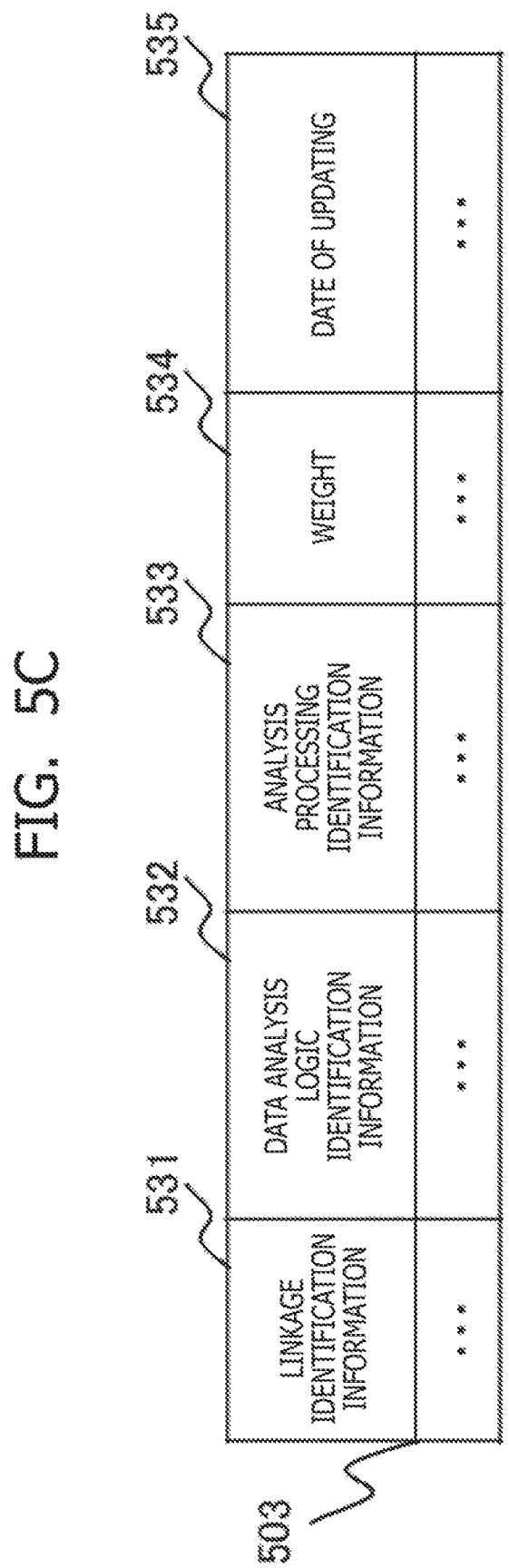

FIG. 5E

| LINKAGE IDENTIFICATION INFORMATION 551 | ANALYSIS PURPOSE IDENTIFICATION INFORMATION 552 | BUSINESS IDENTIFICATION INFORMATION 553 | TARGET IDENTIFICATION INFORMATION 554 | WEIGHT 555 | DATE OF UPDATING 556 |
|---|---|---|---|---|---|
| ... | ... | ... | | ... | ... |

| | IDENTIFICATION INFORMATION 561 | DATA ITEM 562 | TYPE 563 | KIND 564 |
|---|---|---|---|---|
| 506 | 1 | DATA A | CHARACTER STRING | INPUT |
| | 2 | DATA B | NUMERIC VALUE | INPUT |
| | 3 | KILOMETRAGE | NUMERIC VALUE | KEY |

FIG. 6B

| IDENTIFICATION INFORMATION 571 | DATA ITEM 572 | TYPE 573 | SIZE 574 | TABLE 575 |
|---|---|---|---|---|
| 1 | DATA A | CHARACTER STRING | | TABLE 1 |
| 2 | DATA B | NUMERIC VALUE | | TABLE 1 |
| 3 | DATA C | NUMERIC VALUE | | TABLE 2 |

| DATE | PORTION | RESULT | ... |
|---|---|---|---|
| 1/5/·· | a | PRRESENCE | ... |
| 1/5/·· | a | ABSENCE | ... |
| 1/5/·· | b | PRRESENCE | ... |
| 1/5/·· | d | PRRESENCE | ... |
| ... | ... | ... | ... |

TABLE 1, TABLE 2, TABLE 3 ... 304

FIG. 7B

| # | DATA MATCHING LOGIC | DATA ANALYSIS LOGIC | ANALYSIS PROCE-SSING | ANALYSIS PURPOSE | BUSINESS | TARGET | RESULT |
|---|---|---|---|---|---|---|---|
| Result_A | DataLogic_3, DataLogic_4 | AnalysisLogic_3, ... | Process_A | KPI_α | BUSINESS 1 | VEHICLE | **** |
| Result_B | DataLogic_3, DataLogic_7 | AnalysisLogic_1, ... | Process_F | KPI_γ | BUSINESS 3 | AUTOMATIC WICKET MACHINE | **** |
| ... | ... | ... | ... | ... | ... | ... | ... |

| ANALYSIS PROCESSING | EXECUTION FREQUENCY (TIMES/MONTH) | THE NUMBER OF USERS | THE NUMBER OF ROUTINE REGISTRATION | THE NUMBER OF CORRECTIONS | ... |
|---|---|---|---|---|---|
| Process_A | 88 | 235 | 11 | 34 | ... |
| Process_B | 34 | 15 | 1 | 8 | ... |
| Process_C | 85 | 182 | 6 | 44 | ... |
| ... | ... | ... | ... | ... | ... |

306

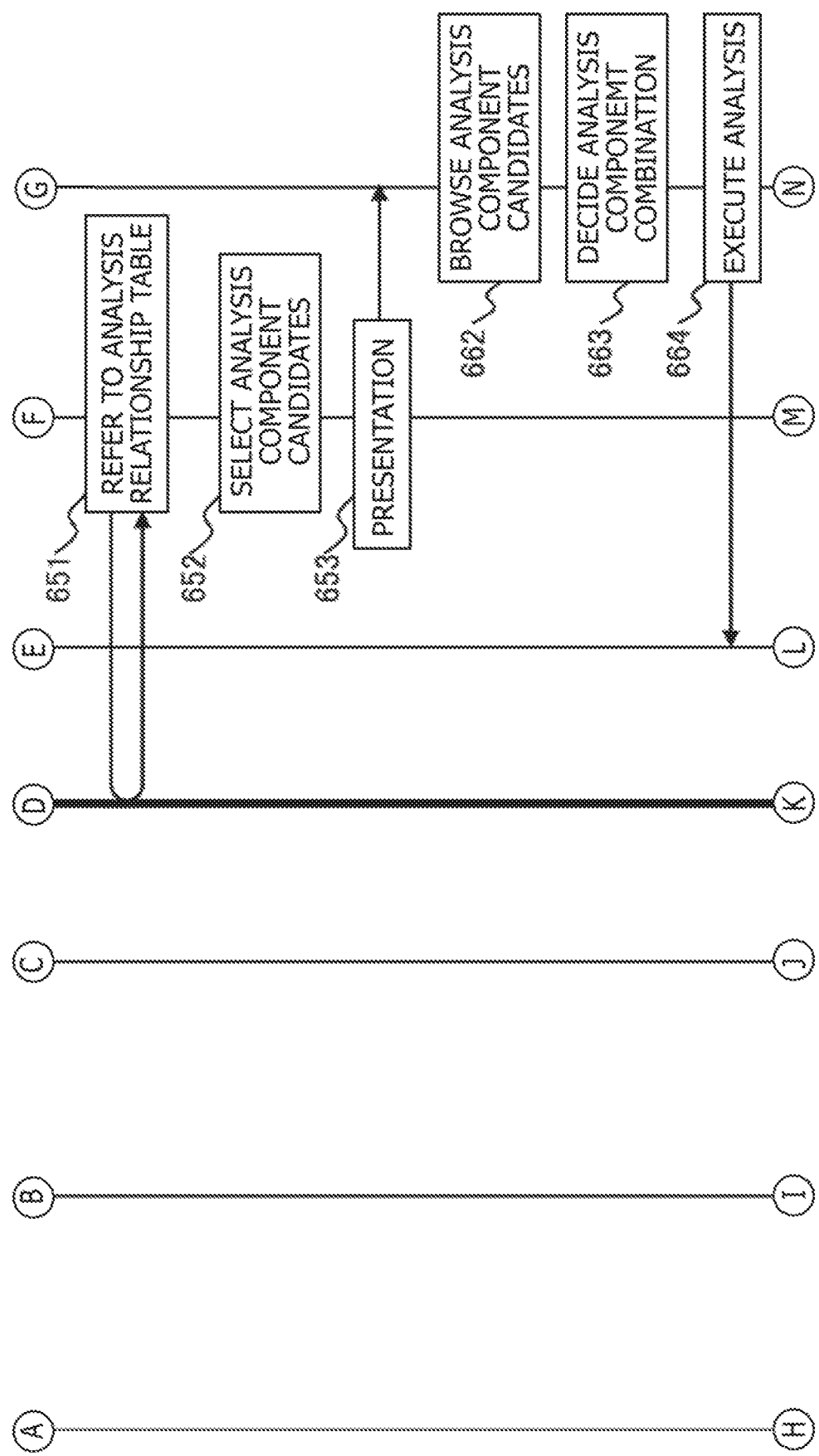

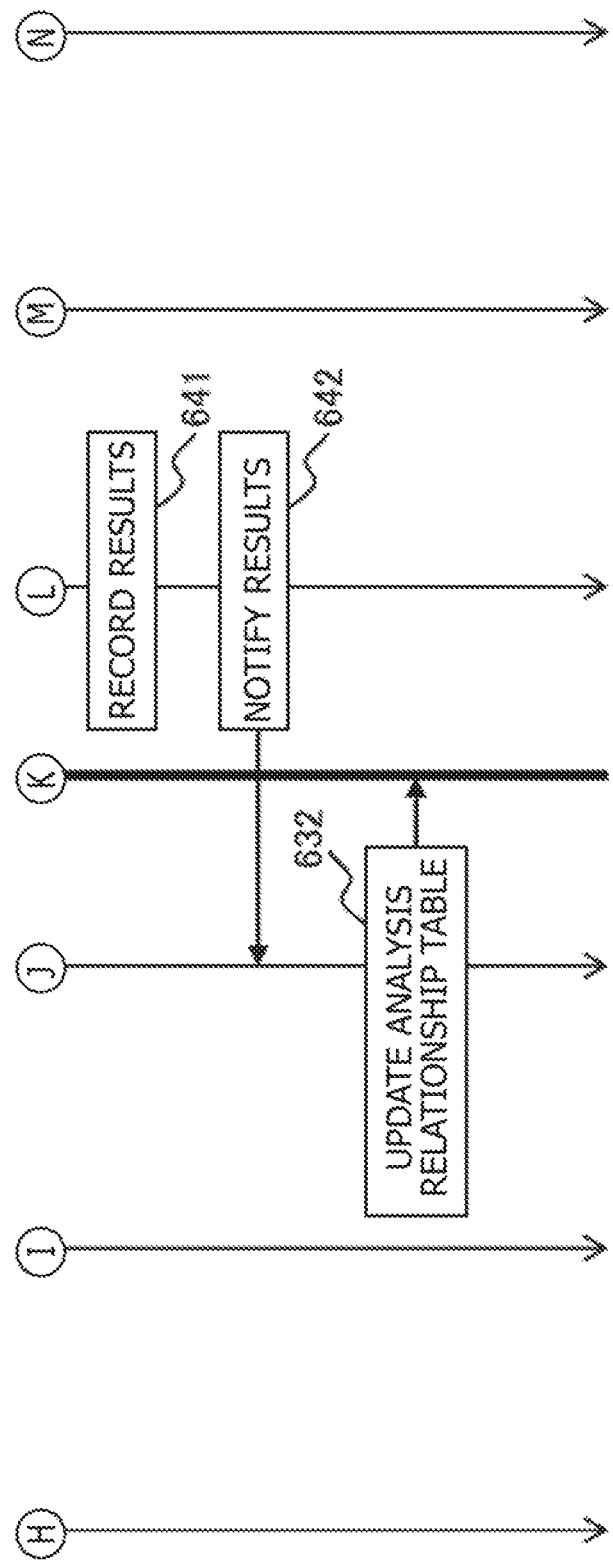

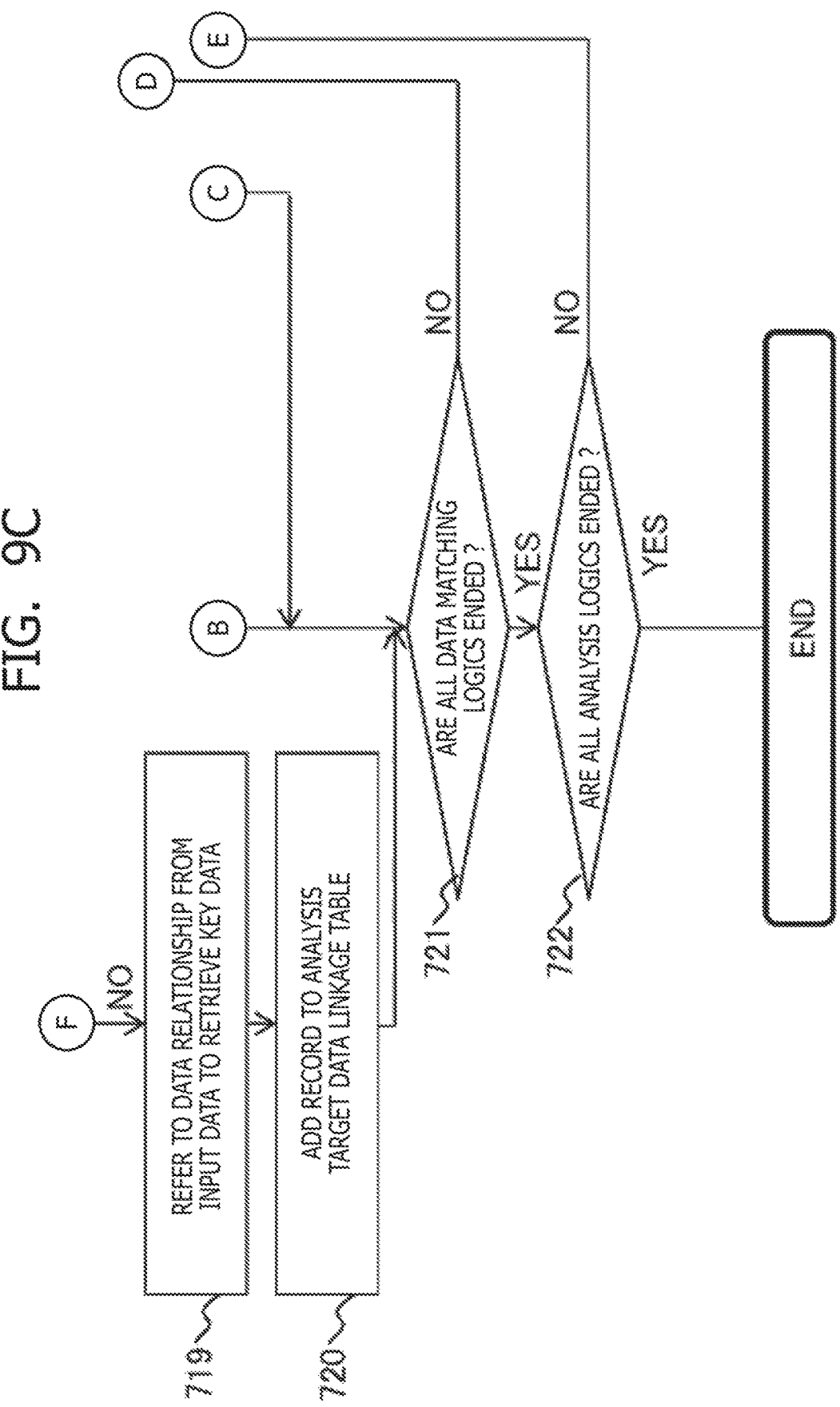

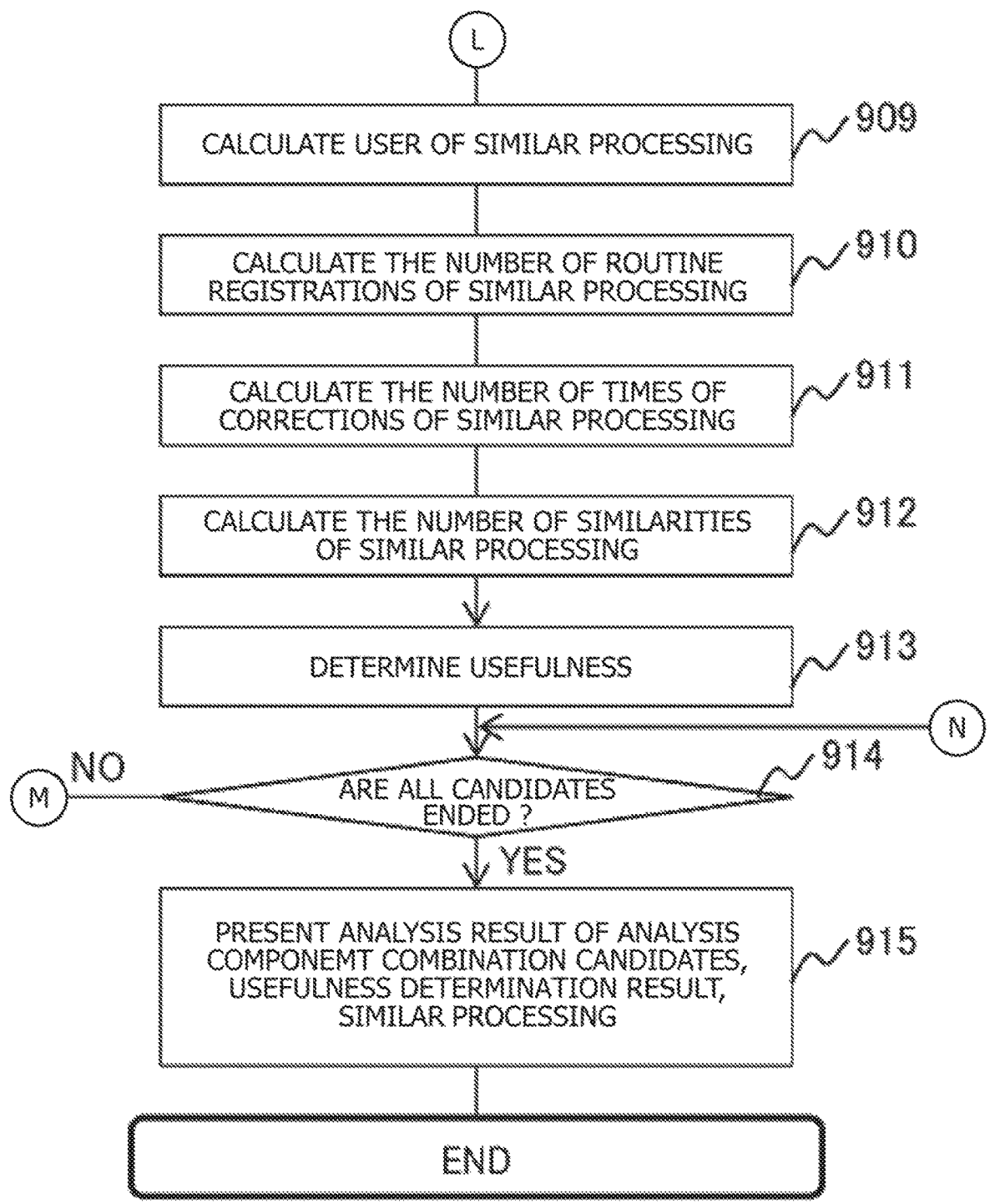

ANALYSIS SOFTWARE MANAGING SYSTEM AND ANALYSIS SOFTWARE MANAGING METHOD

TECHNICAL FIELD

The present invention relates to an analysis software managing system and an analysis software managing method. Specifically, the present invention relates to a technology for enabling proposal of data analysis components to be performed irrespective of the quantity of an implementation history of data analysis, and thus promoting efficiency and cost reduction of production of software for data analysis.

BACKGROUND ART

Since there is progress or the like of a so-called IoT (Internet of Things) technology, a strong tendency to collect and analyze the enormous measured data or the like is developed with regard to various events. For example, for the purpose of solving various problems in businesses in traffic, an electric power, an industry, and other fields, the analysis implementation is required in which pieces of business data are collected inter-disciplinary across departments or businesses, and the pieces of business data are utilized. However, it hinders the analysis implementation that the understanding of a large quantity of business data is required, an attributability based on the business knowledge is high, and so forth. Then, it is required to reduce the various kinds of burdens pertaining to the analysis in such a way that even a person having neither sufficient knowledge of the data analysis/processing nor the sufficient business knowledge can speedily and readily perform the analysis.

As a related technology about such an analysis, for example, there is proposed a data analyzing method in a data analyzing system for executing a plurality of analysis processing for data acquired from an outside. The data analyzing method has: an analysis processing step of executing analysis processing for the data acquired from the outside; a retrieval step of retrieving candidates of analysis processing executed next to the analysis processing in the analysis processing step on the basis of the analysis processing in the analysis processing step, and an analysis history as a history of a plurality of past analysis processing accumulated in a database; and a presentation step of presenting the candidates of the analysis processing retrieved in the retrieval step to an analysis user. The analysis history includes a plurality of analysis processing (refer to Patent Document 1).

In addition, there is also proposed an analysis support processing apparatus for receiving as input thereof a designation item of a condition designating what kind of analysis is performed with respect to results data of an analysis target from a condition designation picture, and displaying analysis data obtained by processing the results data in accordance with the designated condition. This analysis support processing apparatus includes: results data storing means for storing results data including results specification data becoming an analysis target made to correspond to the designation item of the condition designated from the condition designation picture; history data storing means for storing history data including information associated with the designation item of the condition selected in the condition designation picture by each of users, information associated with a business in the user's charge, and information associated with time at which the user refers to the analysis data pertaining to the designation item of the condition selected by the user; and identification information storing means for storing at least information associated with correspondence between identification information and the business in the user's charge of each of the users. This analysis support processing apparatus also includes: means for specifying the business in the user's charge by referring to the identification information storing means from the inputted identification information of the user; history data aggregating means for aggregating the number of times of reference of analysis data pertaining to the designation item of the condition selected within a predetermined period of time by the user in the same business in his/her charge as the business in the user's charge specified every designation item from the history data stored in the history data storing means; condition designation picture editing means for editing the picture in which information associated with the number of times of reference for each designation item aggregated by the history data aggregating means is filled out within the designation items of the condition designation picture; condition designation picture displaying means for displaying the edited condition designation picture on a display apparatus; and means for inputting the designation item of the condition from a condition designation picture displayed by the condition designation picture displaying means. The analysis support processing apparatus also includes: analyzing display picture editing means for editing an analyzing display picture for displaying analysis data obtained by processing the results data in accordance with the inputted designation item of the condition; results display picture displaying means for displaying the analyzing display picture edited by the analyzing display picture editing means on a display apparatus; and history data updating means for updating the history data in the history data storing means from the inputted designation item of the condition, the business in the user's charge, and the time at which the analyzing display picture is displayed (refer to Patent Document 2).

PRIOR ART DOCUMENT

Patent Documents

Patent Document 1: JP-2016-29516-A
Patent Document 2: JP-2010-237900-A

SUMMARY OF THE INVENTION

Problem to be Solved by the Invention

In the related art, the proposal of the analysis processing or the candidates of the analysis target data is performed by referring to the past analysis implementation history. However, since it is assumed that the analysis results history has already been accumulated, the effect is not obtained at a time point of introduction of the system of interest, and at a time point of start of the operation. In addition, it is unknown whether or not the useful analysis result is obtained from the analysis processing selected in accordance with the proposal by the technology of interest unless the user performs the confirmation after the actual execution, and thus it takes time to perform the confirmation.

In the light of the foregoing, the present invention has been made in consideration of the problems described above, and provides a technology for enabling proposal of data analysis components to be performed irrespective of the quantity of an implementation history of data analysis, and thus promoting efficiency and cost reduction of production of software for data analysis.

Then, it is therefore an object of the present invention to provide a technology.

Means for Solving the Problem

An analysis software managing system of the present invention made in order to solve the problems described above executes: processing of generating analysis relationship information prescribing linkage between analysis target data and analysis components executing analysis processing for the analysis target data on the basis of a relationship among a plurality pieces of the analysis target data collected from a plurality of predetermined systems; and processing of specifying a combination of a plurality of the analysis components available for predetermined data designated as an analysis target by a user on the basis of the analysis relationship information.

In addition, an analysis software managing method of the present invention executes, by the information processing system, processing of generating analysis relationship information prescribing linkage between analysis target data and analysis components executing analysis processing for the analysis target data on the basis of a relationship among a plurality pieces of the analysis target data collected from a plurality of predetermined systems by an information processing system; and processing of specifying a combination of a plurality of the analysis components available for predetermined data designated as an analysis target by a user on the basis of the analysis relationship information.

Effect of the Invention

According to the present invention, the proposal of the data analysis components is enabled to be performed irrespective of the quantity of the implementation history of the data analysis, and thus the efficiency and cost reduction of production of the software for data analysis can be promoted.

BRIEF DESCRIPTION OF THE DRAWINGS

FIGS. 1A and 1B are block diagrams depicting an example of a network configuration of a data utilization platform server in an embodiment.

FIGS. 2A and 2B are views depicting an example of a use case where an analysis software managing method in the embodiment is implemented.

FIG. 5A is a diagram depicting an analysis target data linkage table in the embodiment.

FIG. 5B is a diagram depicting an analysis component linkage table in the embodiment.

FIG. 5C is a diagram depicting an analysis component—analysis processing linkage table in the embodiment.

FIG. 5E is a diagram depicting an analysis purpose—business linkage table in the embodiment.

FIG. 6A is a diagram depicting an example of meta information of a data analysis logic in the embodiment.

FIG. 6B is a diagram depicting an example of the meta information of a data matching logic in the embodiment.

FIG. 7A is a diagram depicting an example of a structure of an analysis target data DB in the embodiment.

FIG. 7B is a diagram depicting an example of a structure of an analysis result DB in the embodiment.

FIG. 7C is a diagram depicting an example of a structure of a results information DB in the embodiment.

FIGS. 8A to 8C are flow charts depicting an example of a processing sequence of an analysis software managing method in the embodiment.

FIGS. 9A to 9C are flow charts depicting a flow example 1 of the analysis software managing method in the embodiment.

FIGS. 11A and 11B are flow charts depicting a flow example 3 of the analysis software managing method in the embodiment.

MODES FOR CARRYING OUT THE INVENTION

Network Configuration

Figure 1A:
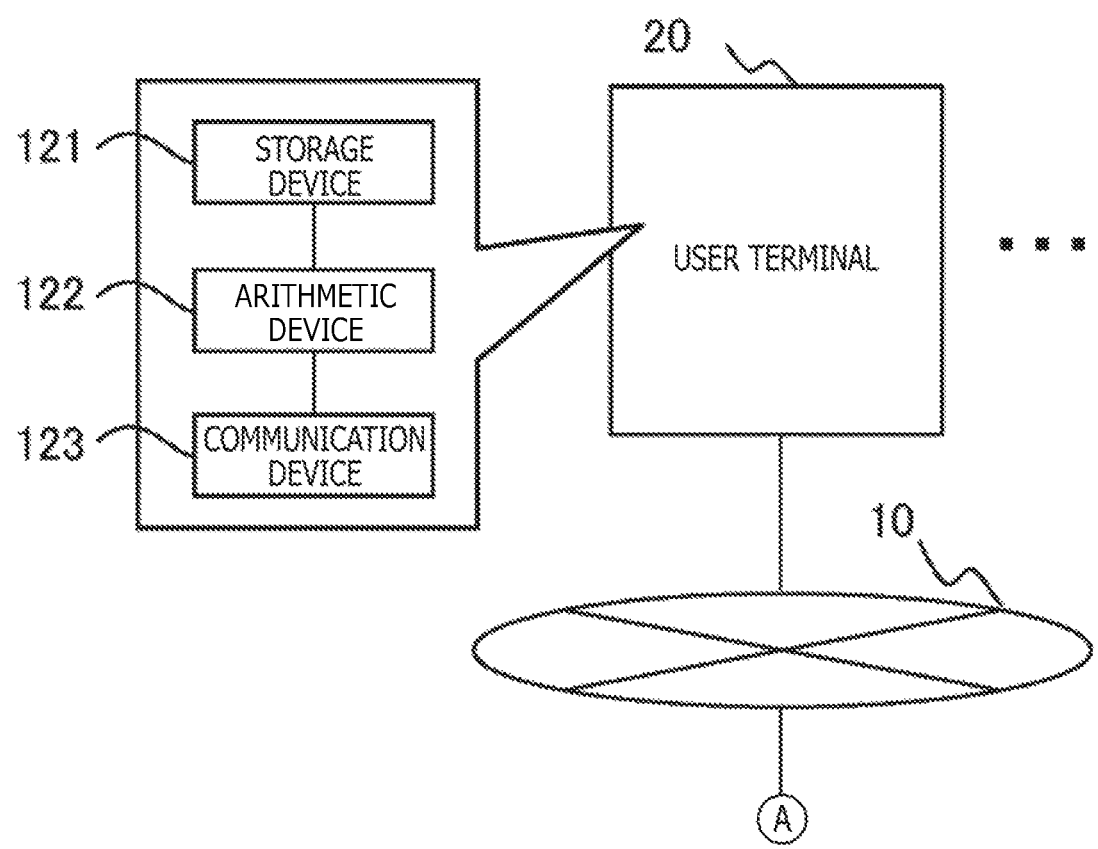

Hereinafter, an embodiment of the present invention will be described in detail with reference to the drawings. FIGS. 1A and 1B are block diagrams depicting an example of a network configuration of a data utilization platform server 101, as an analysis software managing system, in the embodiment. The data utilization platform server 101 is a computer system which enables proposal of data analysis components to be performed irrespective of the quantity of an implementation history of data analysis, and thus promotes efficiency and cost reduction of production of software for data analysis.

The data utilization platform server 101 becomes a server apparatus which performs management and analysis of analysis components constituting analysis processing for data becoming an analysis target, that is, analysis target data, and proposes information associated with the analysis components to a user.

Such a data utilization platform server 101 is communicably connected to a user terminal 20 and a business system 30 through a network 10 and a network 11, respectively. However, data presentation from the business system 30 to the data utilization platform server 101 is by no means limited to the case where the data presentation is performed by communication through the network 11. For example, it is also possible to suppose that the data is stored in the data utilization platform server 101 through a human resource.

The user terminal 20 in the network configuration described above becomes a terminal for performing a manipulation by which analysis target data of data obtained from various business systems 30 is designated to the data utilization platform server 101, and performing a manipulation of confirmation, selection, analysis execution, result confirmation, and the like of a combination of analysis components which are presented by the data utilization platform server 101.

In addition, the business system 30 is a source system for presenting various data (an example: traveling data of a railway vehicle in a railway business, observation data such as a temperature, and vibration of an apparatus, a maintenance history, and the like) becoming analysis target data. The business system 30 becomes a target of problem solution by the analysis.

Hardware Configuration

In addition, a hardware configuration of the data utilization platform server 101 described above is as described below. That is to say, the data utilization platform server 101 is provided with a storage device 111 including a suitable non-volatile storage element such as an SSD (Solid State Drive) or a hard disc drive and a volatile storage element such as a memory, a arithmetic device 112, such as a CPU, which executes a program or the like held in the storage device 111 to perform the general control for the device itself, and executes various determinations, calculation and control processing, and a communication device 113 which is connected to the networks 10 and 11 and plays a role of communication processing with other devices.

Such a hardware configuration also applies to the case of the user terminal 20. For example, the user terminal 20 is provided with a storage device 121 including a suitable non-volatile storage element such as an SSD (Solid State Drive) or a hard disc drive and a volatile storage element such as a memory, a arithmetic device 122, such as a CPU, which executes a program or the like held in the storage device 121 to perform the general control for the device itself, and executes various determinations, calculation and control processing, and a communication device 123 which is connected to the network 10, and plays a role of communication processing of the data utilization platform server 101.

Use Case

Figure 2A:
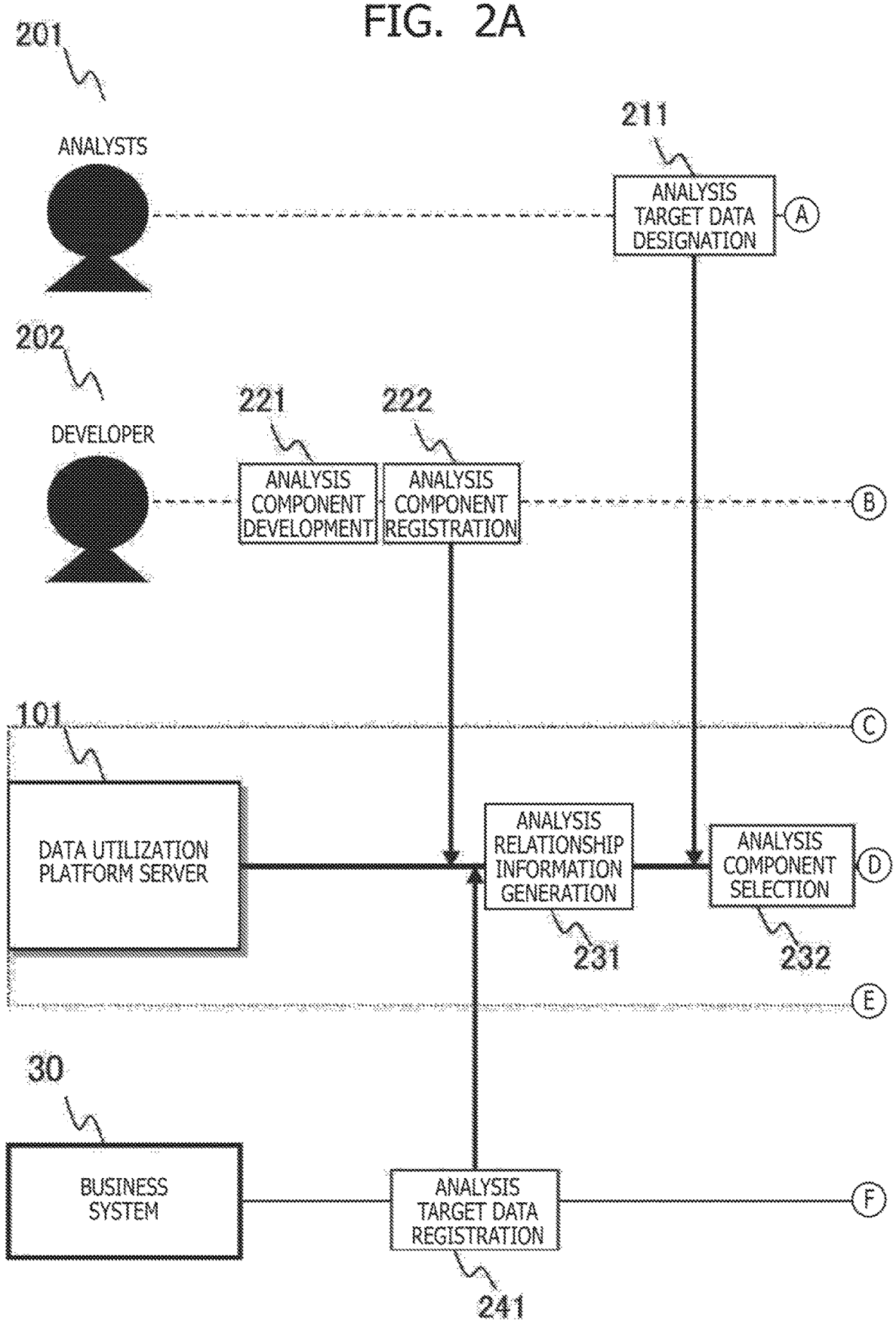

FIGS. 2A and 2B are views depicting a use case in the case where an analysis software managing method in the embodiment is implemented. Main constituent elements in the use case depicted in FIGS. 2A and 2B are the data utilization platform server 101 which accumulates data becoming an analysis target, that is, analysis target data, and performs management and analysis of the analysis components constituting the analysis processing for the analysis target data, thereby performing the proposal of the information associated with the analysis components to the user, the business system 30 as the source of the presentation of the analysis target data, an analyst 201 who performs the analysis for the analysis target data, and a developer 202 who performs the development of the analysis components or the like.

Of them, the developer 202 performs the development of the analysis components as a software program (221), and registers the analysis components thus developed in the data utilization platform server 101 (222).

In addition, when the analysis target data is registered in the data utilization platform server 101 by the communication from the business system 30 through the network 11, or by the manpower (241), analysis relationship information is generated in the foundation 101 for use and application of data (231).

On the other hand, the analyst 201, for the purpose of implementing the analysis, designates the analysis target data by using the user terminal 20 (211).

In this case, the data utilization platform server 101 selects the analysis components suitable for the analysis target data designated by the analyst 201 (232), and proposes the analysis components thus selected to the analyst 201 (233). The analyst 201 browsers the analysis component candidates obtained by the proposal, and associated information (212). In addition, the analyst 201 determines a combination of the analysis components which are to be used for the analysis target data designated by himself or herself on the basis of the browsed contents (213). The analyst 201 executes the analysis processing based on the combination of the analysis components thus decided (214, 234), and confirms the analysis result (215).

Module Configuration

Figure 3A:
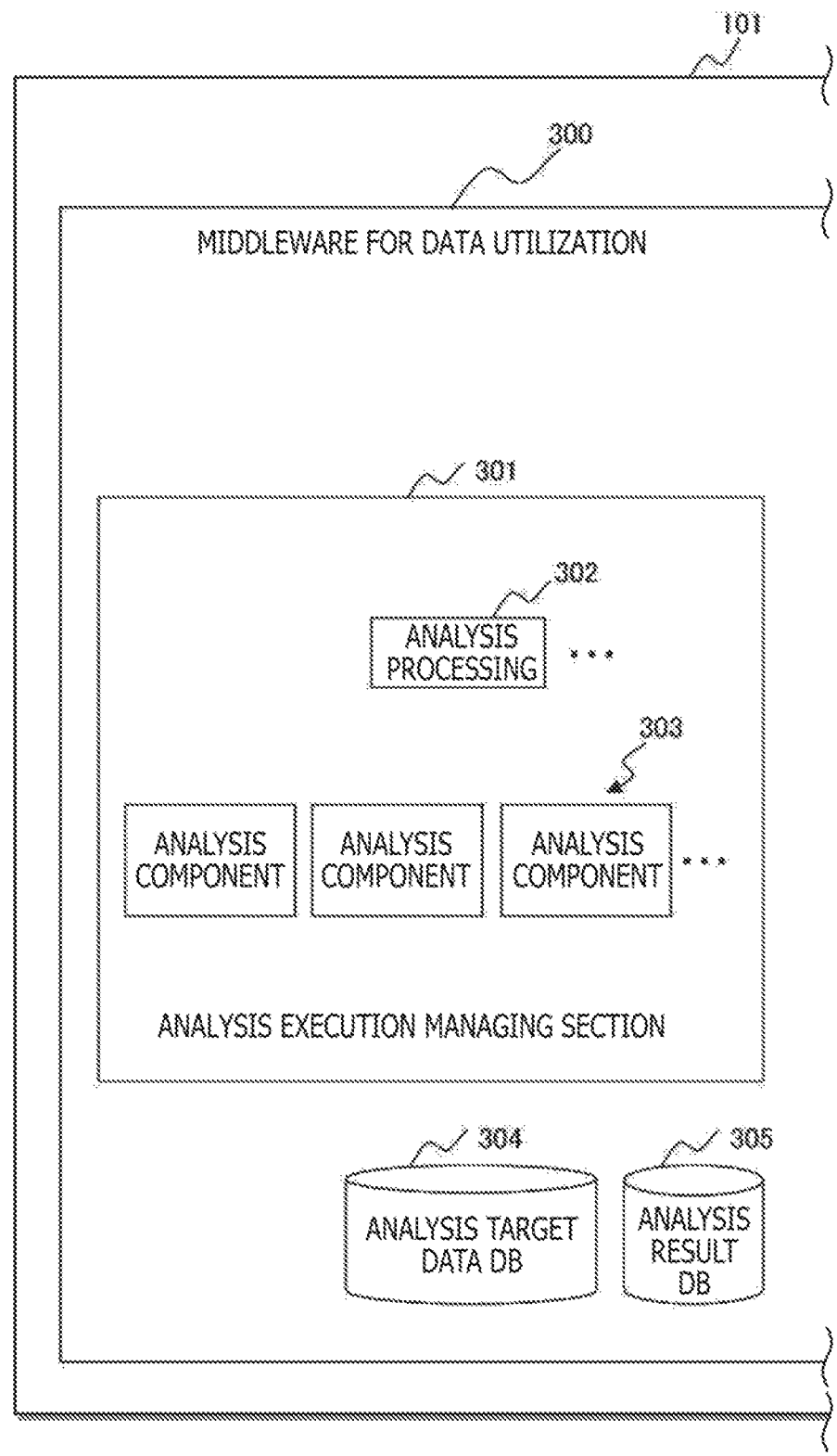
FIGS. 3A and 3B are block diagrams depicting an example of a module configuration of the data utilization platform server in the embodiment.
Figure 3B:
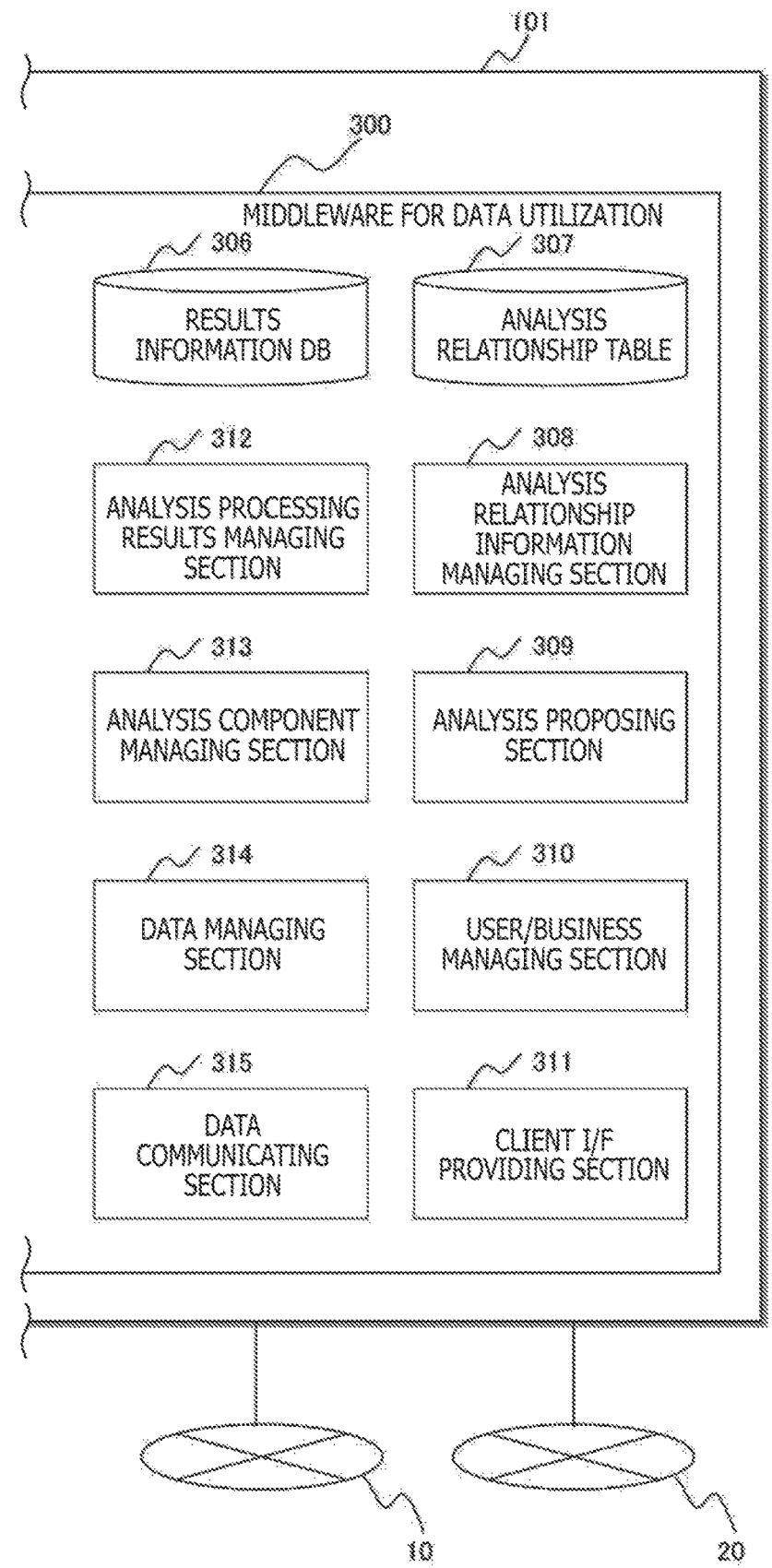

FIGS. 3A and 3B are block diagrams depicting a module configuration of the data utilization platform server 101 in the embodiment.

Middleware for data utilization 300 which accumulates the analysis target data, performs the management and the analysis of the analysis components constituting the analysis processing for that analysis target data, thereby executing the processing such as the proposal of the analysis components of interest to the user is introduced into the data utilization platform server 101 in the embodiment.

Main constituent elements of the middleware for data utilization 300 includes an analysis execution managing section 301 which performs execution management of the analysis processing 302 based on the combination of the analysis components 303, an analysis target data DB 304 which stores the data as the analysis target registered from a plurality of business systems 30, an analysis result DB 305 which stores a result of execution of the analysis processing, a results information DB 306 which stores results information associated with the analysis processing executed in the analysis execution managing section 301, an analysis relationship table 307 which stores analysis relationship information, and an analysis relationship information managing section 308 which manages the analysis relationship table 307. The main constituent elements of the middleware for data utilization 300 also includes an analysis proposing section 309 which performs the proposal of the combination of the analysis components for the user by referring to the analysis relationship table 307, a user and business managing section 310 which accesses the middleware for data utilization 300 to perform the analysis, thereby managing the user and the business, an client I/F providing section 311 for a client which presents an interface having a function which the middleware for data utilization 300 presents to the user terminal 20, an analysis processing results managing section 312 which manages the results information DB 306, an analysis component managing section 313 which managing analysis components 303 executed in the analysis execution managing section 301, a data managing section 314 which manages the data stored in the analysis target data DB 304, and a data communicating section 315 which performs the communication with the user terminal 20 or the business system 30 through the network 10 or the network 11.

Analysis Relationship Information

Figure 4A:
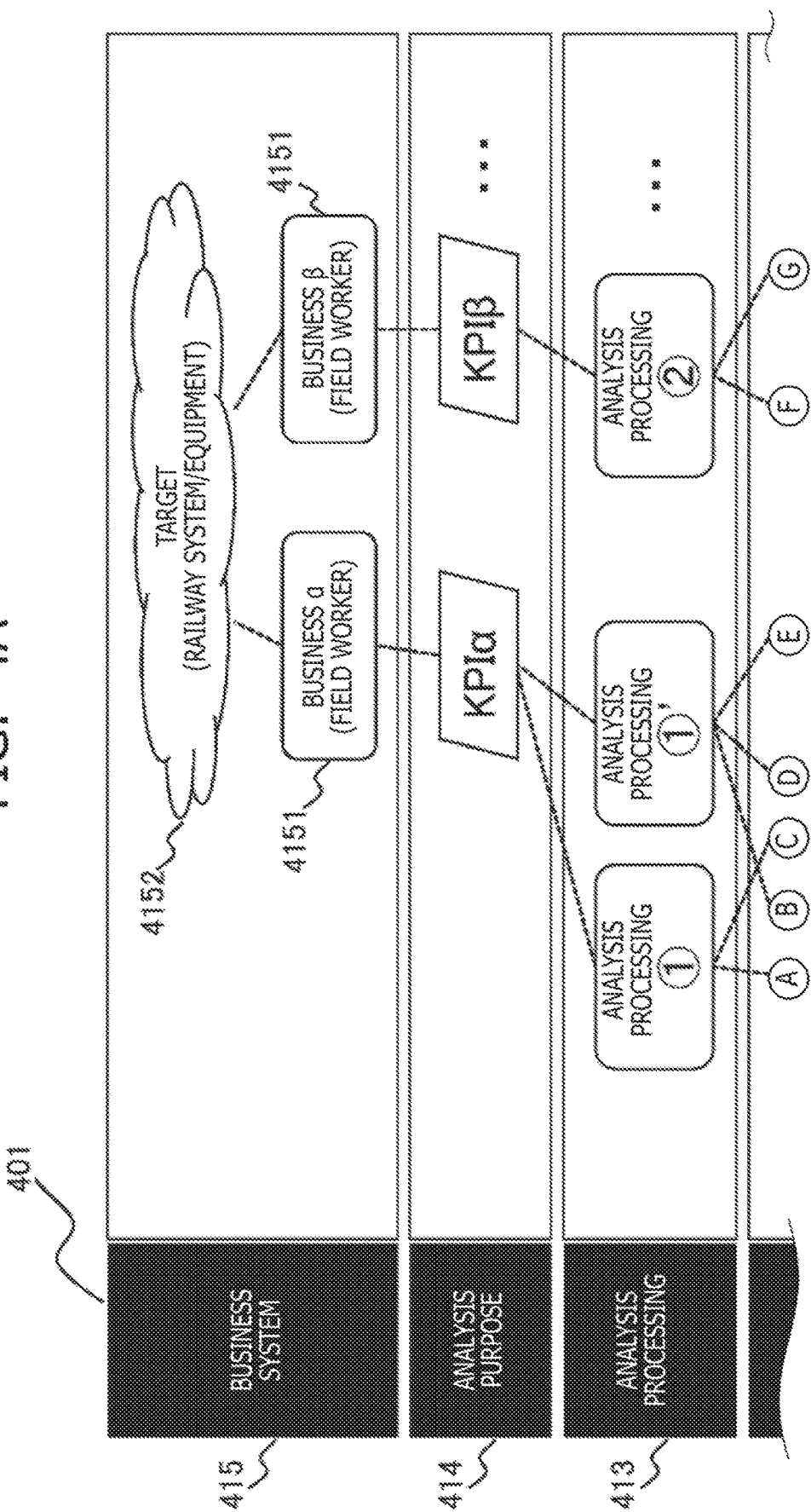
FIGS. 4A and 4B are views depicting analysis relationship information corresponding to an example of a relationship among analysis target data, an analysis component, analysis processing, an analysis purpose, and a business system in the embodiment.
Figure 4B:
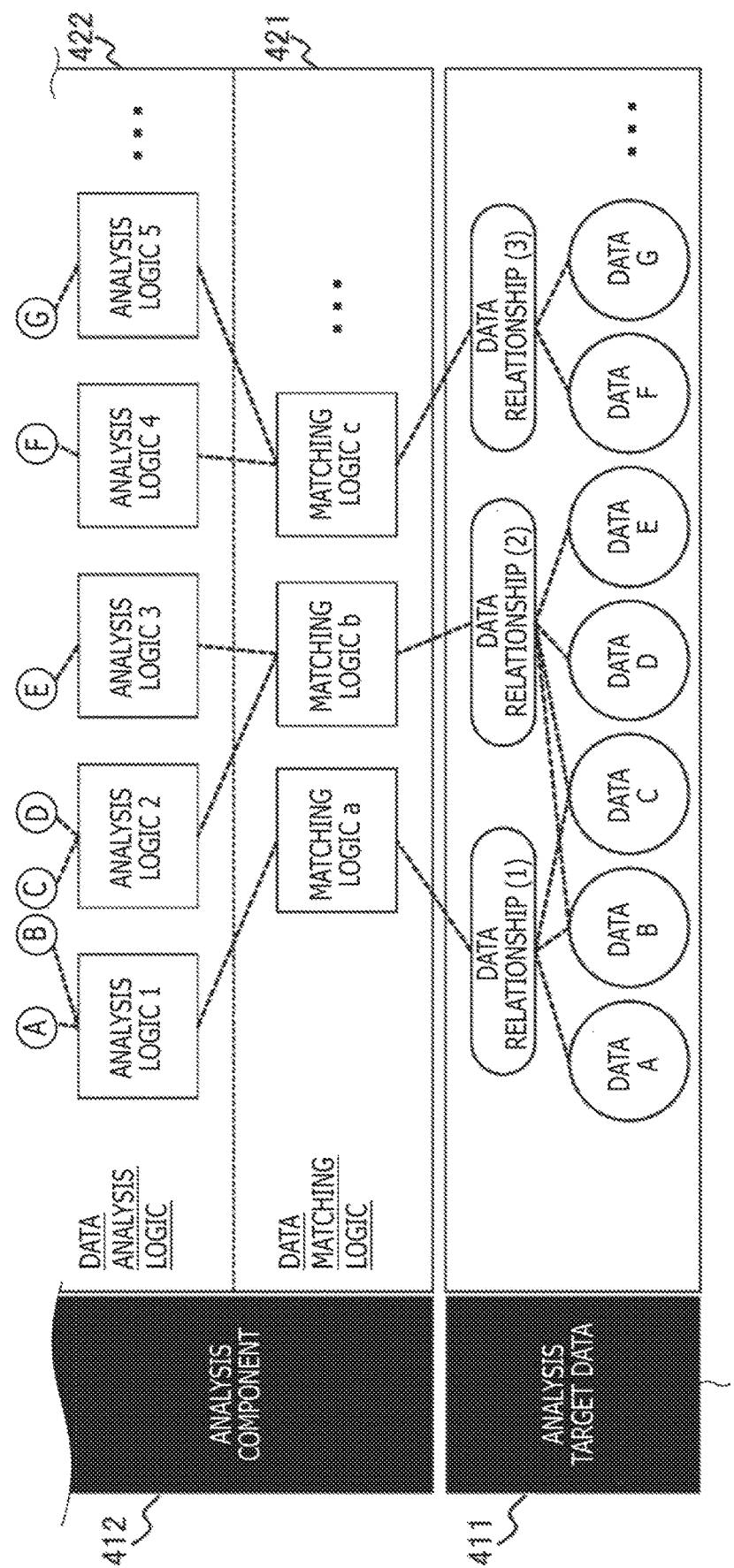

FIGS. 4A and 4B are diagrams depicting analysis relationship information 401 corresponding to a relationship example of the analysis target data, the analysis component, the analysis processing, the analysis purpose, and the business system in the embodiment.

The analysis relationship information 401 in the embodiment means the expression of the relationship among the data and the analysis components used in the analysis, the analysis processing based on the combination thereof, and the analysis purpose and the business, the equipment as the destination of the implementation of the business, and the like in the business system for the analysis purpose of interest. It should be noted that the "relationship" means the matter which is available by combining the matters associated with each other, or has the results of the utilization. In order to select and propose the suitable analysis components for the analysis target data designated by the user, the data utilization platform server 101 refers to the analysis relationship information 401.

Main constituent elements are the pieces of information of analysis target data 411, analysis component 412, analysis processing 413, an analysis purpose 414, and a business system 415. The pieces of information are made off into hierarchies every piece of information to be managed. Of them, the analysis component 412 is classified into a data matching logic 421 and a data analysis logic 422. Here, it is supposed that the data matching logic 421 and the data analysis logic 422 which are necessary for implementing the analysis for the analysis target data are reusable as the software components constituting the analysis components, and the analysis processing is constituted by a combination of these components.

Firstly, in the hierarchy of the analysis target data 411, data from a plurality of business systems 30 becoming the analysis target and the relationship between the pieces of data are managed. It should be noted that the data relationship, for example, is produced by the method disclosed in Japanese Patent Laid-Open No. 2016-209063.

In addition, in the hierarchy of the analysis component 412, the data matching logic 421 as the processing logic (for example, an SQL statement, or the like) for extracting a combination of one or more pieces of analysis target data from an accumulation media such as a database, and the data analysis logic 422 as an analysis logic (for example, graphing of series data, correlation analysis, or the like) which is implemented for the one or more pieces of analysis target data are managed.

In addition, in the hierarchy of the analysis processing 413, data analysis processing produced by a combination of the one or more pieces of analysis target data and one or more analysis components is managed.

In addition, in the hierarchy of the analysis purpose 414, KPI information as the purpose of performing the analysis is managed. In addition, in the hierarchy of the business system 415, a business 4151 and a target 4152 such as the equipment in the business system required for the KPI as the purpose of performing the analysis described above are managed.

It should be noted that the linkage (linking) between the elements having the relationship in the hierarchies is performed between the hierarchies.

Table

FIG. 5A to FIG. 6B are respectively diagrams depicting a structure of the analysis relationship table 307 in which the linkage information between the elements in the analysis relationship information 401 is stored and which is managed in the data utilization platform server 101 in the embodiment, and a data structure of meta information associated with the analysis components.

In the embodiment, the analysis relationship table 307 which manages the linkage information among the elements in the analysis relationship information 401 includes an analysis target data linkage table 501, an analysis component linkage table 502, an analysis component—analysis processing linkage table 503, an analysis processing—analysis purpose linkage table 504, and an analysis purpose—business linkage table 505.

Of them, the analysis target data linkage table 501 exemplified in FIG. 5A is a table in which information associated with the linkage between the analysis target data 411 of the analysis relationship information 401, and the data matching logic 421 in the analysis component 412 is stored. Main constituent elements are linkage identification information 511 which uniquely specifies the pieces of linkage, analysis target data identification information 512, data matching logic identification information 513, weight 514, and a date 515 of updating.

Information for identifying the linkage is stored in the linkage identification information 511 described above. In addition, information for identifying the analysis target data as one of the linked data is stored in the analysis target data identification information 512. In addition, information for identifying the data matching logic as the other of the linked data is stored in the data matching logic identification information 513. In addition, information indicating the weight of the linkage is stored in the weight 514. For example, as the more combinations by the linkage are used in the user of the analyst or the like, the numeric value representing the weight becomes large. In addition, the dates on which the records of the items 511 to 514 described above were finally updated are stored in the date 515 of updating. It should be noted that since there may be a plurality of linkages for one piece of analysis target data, with respect to the analysis target data, a plurality of records may be stored in the analysis target data linkage table 501.

In addition, the analysis component linkage table 502 exemplified in FIG. 5B is a table in which information associated with the linkage between the data matching logic 421 in the analysis component 412 of the analysis relationship information 401, and the data analysis logic 422 is stored. Main constituent elements thereof are linkage identification information 521, data matching logic identification information 522, data analysis logic identification information 523, weight 524, and date 525 of updating.

Of them, information for uniquely identifying the linkage is stored in the linkage identification information 521. In addition, information for identifying the data matching logic as one of the linkage data is stored in the data matching logic identification information 522. In addition, information for identifying the data analysis logic as the other of the linked data is stored in the data analysis logic identification information 523. In addition, information indicating the weight is stored in the weight 524. In addition, as the more combinations by the linkage are used in the user as the analyst or the like, the numeric value representing the weight becomes large. In addition, the dates on which the records of the data items 521 to 524 described above were finally updated are stored in the data 525 of updating. It should be noted that since there may be a plurality of linkages for one data matching logic and data analysis logic, with respect to the one data matching logic and the one piece of data analysis logic, a plurality of records may be stored in the analysis component linkage table 502.

In addition, the analysis component—analysis processing linkage table 503 exemplified in FIG. 5C is a table for storing information associated with the linkage between the data analysis logic 422 in the analysis component 412 of the analysis relationship information 401, and the analysis processing 413 executed by the user as the analyst or the like. Main constituent elements thereof are linkage identification information 531, data analysis logic identification information 532, analysis processing identification information 533, weight 534, and a date 535 of updating.

Of them, information for uniquely identifying the linkage is stored in the linkage identification information 531. In addition, information for identifying the data analysis logic 422 as one of the linked data is stored in the data analysis logic identification information 532. In addition, information for identifying the analysis processing 413 as the other of the linked data is stored in the analysis processing identification information 533. In addition, information indicating the weight of the linkage is stored in the weight 534. For example, as the more combinations by the linkage are used in the user as the analyst or the like, the numeric value representing the weight becomes large. In addition, the dates on which the records of the data items 531 to 534 described above were finally updated are stored in the date 535 of updating. It should be noted that since there may be a plurality of linkages for one data analysis logic 422, with respect to the one data analysis logic 422, a plurality of records may be stored in the analysis component—analysis processing linkage table 503.

Figure 5D:
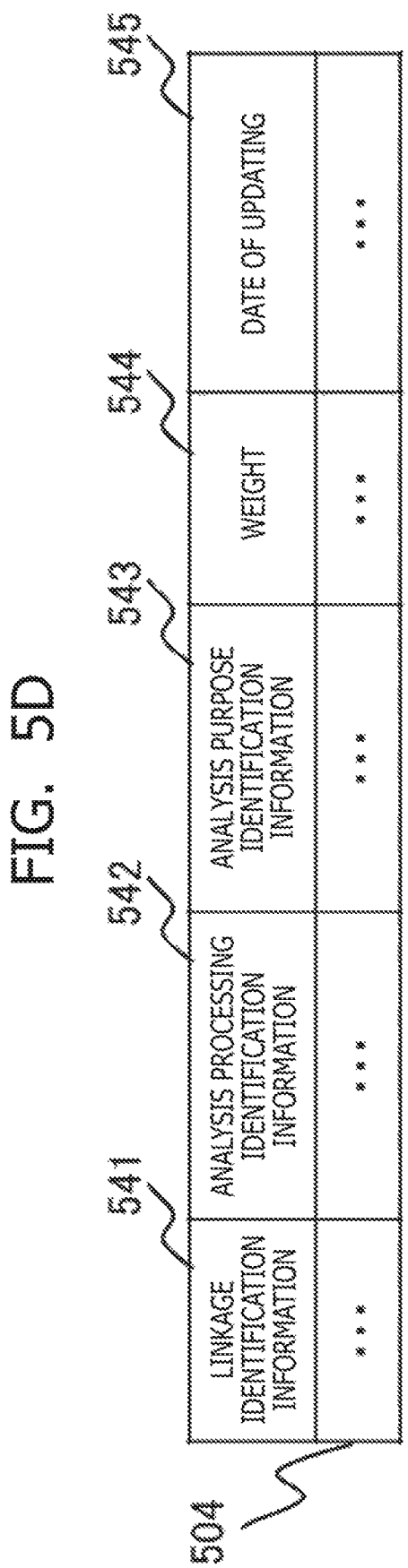
FIG. 5D is a diagram depicting an analysis processing—analysis purpose linkage table in the embodiment.

In addition, the analysis processing—analysis purpose linkage table 504 exemplified in FIG. 5D is a table in which information associated with the linkage between the executed analysis processing in the analysis processing 302, and the KPI in the analysis purpose 414 is stored. Main constituent elements thereof are linkage identification information 541, analysis processing identification information 542, analysis purpose identification information 543, weight 544, and a date 545 of updating.

Of them, information for uniquely identifying the linkage is stored in the linkage identification information 541. In addition, information for identifying the analysis processing 413 as one of the linked data is stored in the analysis processing identification information 542. In addition, information for identifying the analysis purpose 414 as the other of the linked data is stored in the analysis purpose identification information 543. In addition, information indicating the weight of the linkage is stored in the weight 544. For example, as the more combinations by the linkage are used in the user as the analyst or the like, the numeric value representing the weight becomes large. In addition, the dates on which the records of the data items 541 to 544 described above were finally updated are stored in the date 545 of updating. It should be noted that since there may be a plurality of linkages for one analysis processing 413, with respect to the one piece of data analysis processing 413, a plurality of records may be stored in the analysis processing—analysis purpose linkage table 504.

In addition, the analysis purpose—business linkage table 505 exemplified in FIG. 5E is a table in which information associated with the linkage between the KPI in the analysis purpose 414, and an target such as a business, equipment and the like in the business system 415 is stored. Main constituent elements thereof are linkage identification information 551, analysis purpose identification information 552, business identification information 553, target identification information 554, weight 555, and a date 556 of updating.

Of them, information for uniquely identifying the linkage is stored in the linkage identification information 551. In addition, information for identifying the analysis purpose 414 as one of the linked data is stored in analysis purpose identification information 552. In addition, information for identifying a business 4151 as the other of the linked data is stored in the business identification information 553. In addition, information for identifying a target 4152 linked together with the business 4151 is stored in the target identification information 554. In addition, information indicating the weight of the linkage is stored in the weight 555. For example, as the more combinations by the linkage are used in the user as the analyst or the like, the numeric value representing the weight becomes large. In addition, the dates on which the records of the data items 551 to 555 described above were finally updated are stored in the date 556 of updating. It should be noted that since there may be a plurality of linkages for one analysis purpose, with respect to the one analysis purpose described above, a plurality of records may be stored in the analysis purpose—business linkage table 505.

It should be noted that the meta information 506 of the data analysis logics 422, and the meta information 507 of the data matching logics 421 are also stored in the analysis relationship table 307 in the embodiment.

Of them, information associated with data as an input to the data analysis logic 422 is stored in the meta information 506 of the data analysis logic 422 exemplified in FIG. 6A. Main constituent elements thereof are identification information 561, a data item 562, a type 563, and a kind 564.

Of them, information for uniquely identifying the records of the meta information 506 is stored in the identification information 561. In addition, a name of the data corresponding to the data item is stored in the data item 562. However, there is no designation of this item in some cases. In addition, a data type of the data corresponding to the data item 562 described above is stored in the type 563. In addition, a kind of the data corresponding to the data item 562 described above is stored in the kind 564.

Here, "input," "key" or the like may be supposed as a value of the kind 504. Of them, in the case where the value of the kind 564 is "input," it is represented that the corresponding data item is input data to the data analysis logic. In addition, in the case where the value of the kind 564 is "key," it is represented that the corresponding data item is a common index becoming essential to matching of a plurality of data, range designation, an array in the data analysis logic.

In addition, information associated with the data presented from the data matching logic 421 is stored in the meta information 507 of the data matching logic 421 exemplified in FIG. 6B. Main constituent elements thereof are identification information 571, a data item 572, a type 573, a size 574, and a table 575.

Of them, information for uniquely identifying the records in the meta information 507 is stored in the identification information 571. In addition, a name of the data corresponding to the data item 572 is stored in the data item 572. In addition, a data type of the data corresponding to the data item 572 is stored in the type 573. In addition, a size of the data corresponding to the data item 572 is stored in the size 574. In addition, information associated with the table as an extraction source for the data corresponding to the data item 572 is stored in the table 575.

FIG. 7A is a diagram depicting an example of a structure of the analysis target data DB 304 in the embodiment. The analysis target data DB 304 in the embodiment is data which is uploaded from the business system 30 into the data utilization platform server 101, or is stored through a recording media by the suitable user or the like. More specifically, the data managed by the business system 30, for example, sensing data or the like of a vehicle, an apparatus or the like used in the corresponding business can be supposed (of course, the data is by no means limited thereto, and various data can be supposed).

The analysis target data DB 304 exemplified in FIG. 7A, as an example, is configured by a plurality of tables. Each of these tables corresponds to the table as the data extraction source designated in the table 575 of the meta information 507 depicted in FIG. 6B (of the data matching logic). In addition, the tables, as depicted in the figure, for example, are an aggregation of the records including values such as a date, a point, and a result when the corresponding data was observed.

FIG. 7B is a diagram depicting an example of a structure of the analysis result DB 305 in the embodiment. The analysis result DB 305 in the embodiment is a DB in which contents of analysis processing executed on the basis of the analysis components which the data utilization platform server 101 proposed in the past, or the analysis components which the analyst 201 (or the developer 202) selects independently of analysis components proposed are stored. Specifically, the analysis result DB 305 is an aggregation of the records including the information of the data matching logic and the data analysis logic of the analysis components constituting the analysis processing with the ID uniquely specifying the analysis result as a key, and the values such as the analysis processing executed by using those, the analysis purpose thereof, the business, the target, and the result (in this case, the data value outputted as the result of execution of the analysis processing).

FIG. 7C is a diagram depicting an example of a structure of the results information DB 306 in the embodiment. The results information DB 306 in the embodiment is a DB in which the results information actually executed is stored. Specifically, the results information DB 306 is an aggregation of records in which the values such as the frequency of execution of the analysis processing (an example: the number of times of the execution in the most recent one month), the number of users, the number of routine registrations, and the number of corrections (an example: the number of times by which with respect to the analysis processing, the analyst 201 or the developer 202 performs the correction) are made to correspond to one another with an analysis processing name uniquely specifying the analysis processing as a key. It should be noted that the number of routine registrations means the number of times by which the analysis processing is recognized by the analyst or the like as that the analysis processing is used at a high frequency or in a wide range, and which is set as the routine analysis processing.

Sequence Example

Hereinafter, a description will be given with respect to actual procedures of an analysis software managing method in the embodiment with reference to the drawings. Various kinds of operations corresponding to the analysis software managing method which will be described below is realized by a program which is executed by the data utilization platform server 101 as the analysis software managing system. Then, the program is constructed from codes for performing the various kinds of operations which will be described below.

Figure 8A:
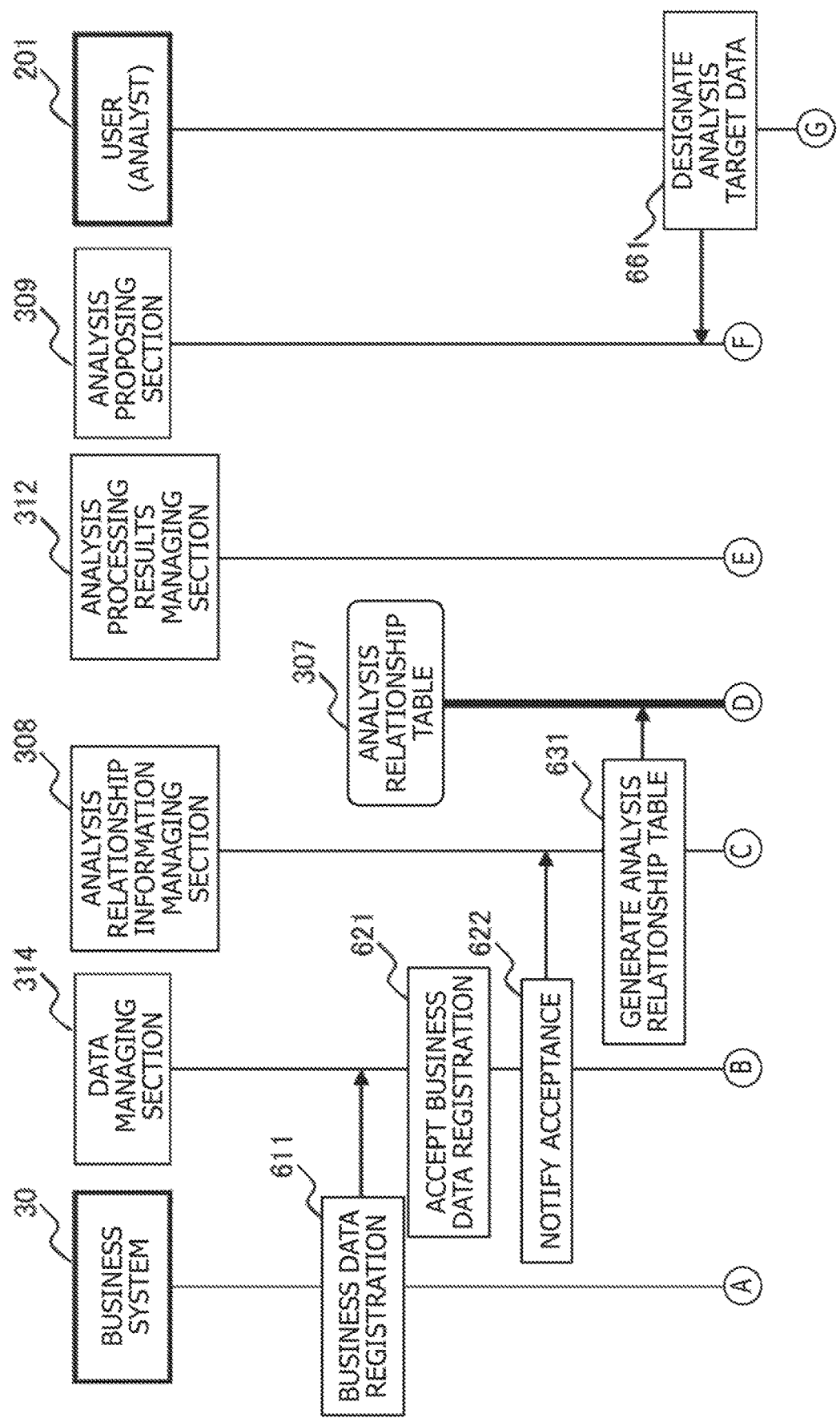

FIGS. 8A to 8C are diagrams depicting a processing sequence in the case where the analysis software managing method in the embodiment is implemented. In this case, a processing sequence in the case where the use case previously depicted in FIGS. 2A and 2B is performed shall be depicted.

Main constituent elements thereof are the business system 30, the data managing section 314, the analysis relationship information managing section 308, the analysis processing results managing section 312, the analysis proposing section 309, and the analysis relationship table 307 which are included in the middleware for data utilization 300 operating in the data utilization platform server 101, and the user (analyst) 201.

Of them, in the business system 30, the business data which the business system 30 has is registered in the data utilization platform server 101 (611). In this case, the data managing section 314 of the data utilization platform server 101 accepts the registration of the business data from the business system 30 described above (621). In addition, the data managing section 314 notifies the analysis relationship information managing section 308 of the acceptance of the registration of the business data (622).

On the one hand, when the analysis relationship information managing section 308 receives the notification from the data managing section 314 described above, the analysis relationship information managing section 308 produces the analysis relationship table 307 from the business data (631).

On the other hand, for the purpose of solving the problems in the business system, the user (analyst) 201 designates the data as the analysis target for performing the analysis (661).

At this time, when the analysis proposing section 309 of the data utilization platform server 101 accepts the designation of the analysis target data from the user (analyst) 201 described above, the analysis proposing section 309 selects the combination candidates of the analysis components available for the analysis target data (652) by referring to the analysis relationship table 307 (651). In addition, the analysis proposing section 309 proposes the selected combination candidates of the analysis components to the user (analyst) 201 (653).

The user (analyst) 201 browses the combination candidates of the analysis components proposed from the analysis proposing section 309 described above (662), and decides the combination of the analysis components utilized in the analysis (663). The user 201 selects any of the combinations of the analysis components proposed in this stage, or changes a part of the combinations of the analysis components proposed in this stage, thereby deciding the analysis components to be utilized. In addition, the user executes the analysis processing based on the combination of the analysis components thus decided (664).

On the other hand, the analysis processing results managing section 312 confirms the execution of the analysis processing by the user described above, records the results (the combination of the analysis components, the history of the processing execution, the analysis result) pertaining to the analysis processing execution (641), and notifies the analysis relationship information managing section 308 of the results recording (642). In this case, when the analysis relationship information managing section 308 receives the notification from the analysis processing results managing section 312 described above, the analysis relationship information managing section 308 updates the analysis relationship table from the results of interest (632).

Flow Example

Figure 9A:
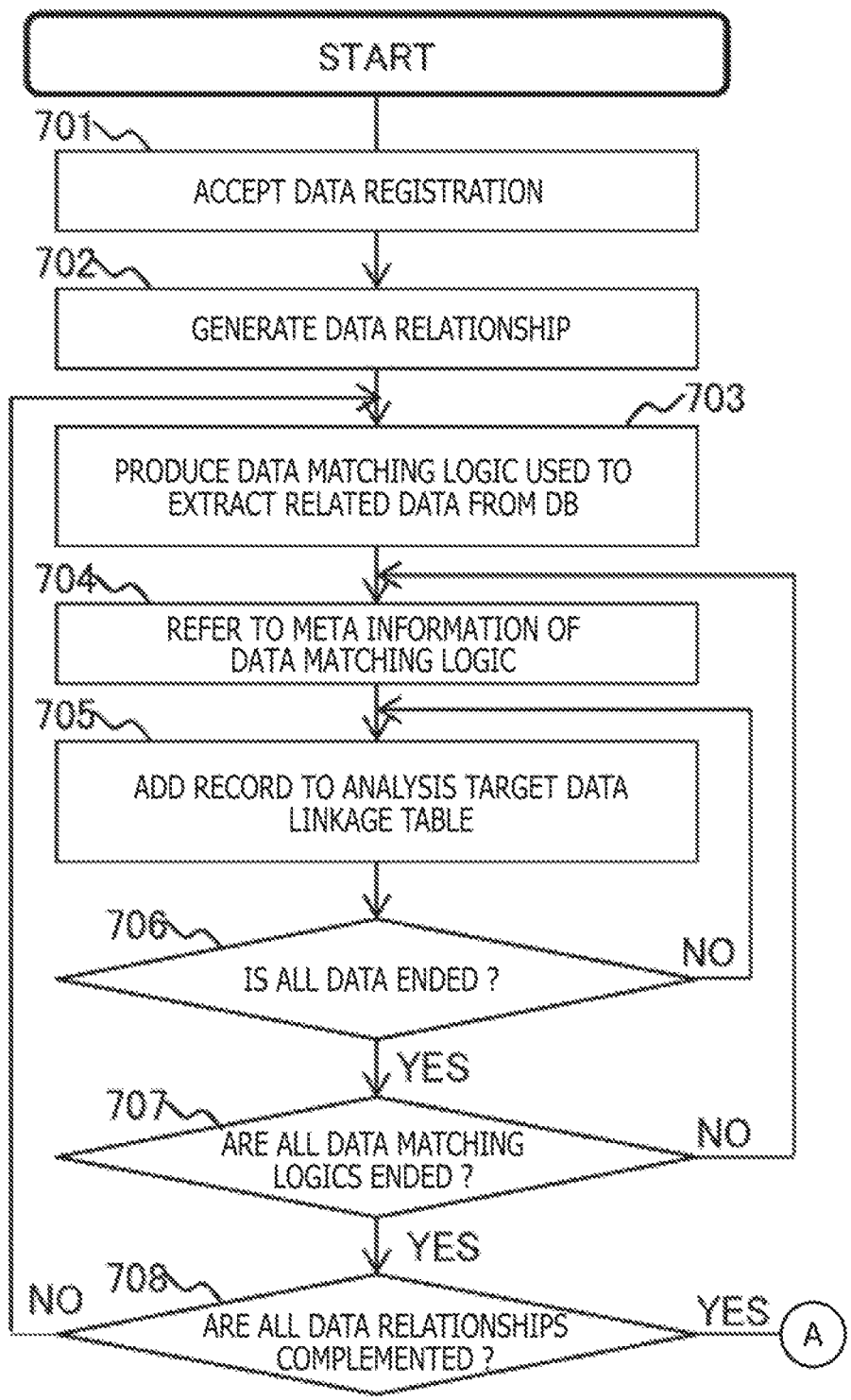
Figure 9B:
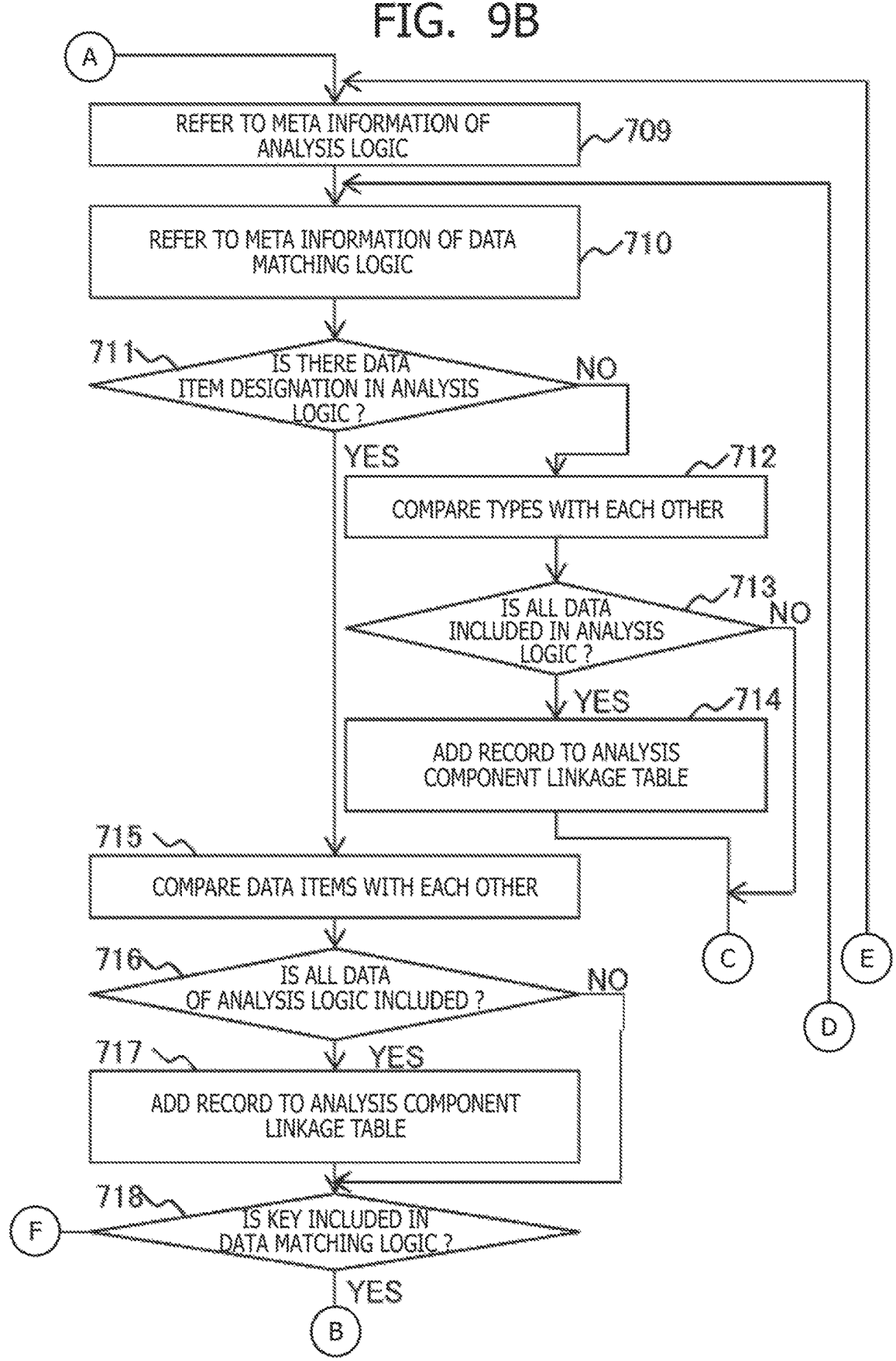
Figure 10A:
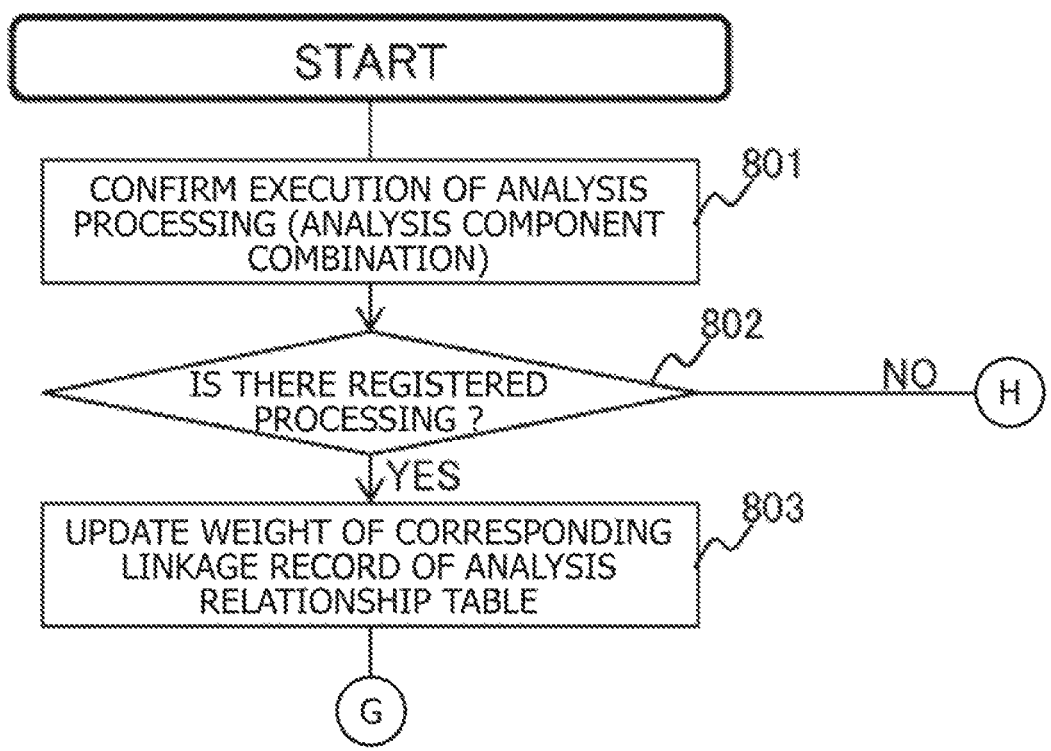
FIGS. 10A to 10D are flow charts depicting a flow example 2 of the analysis software managing method in the embodiment.
Figure 10B:
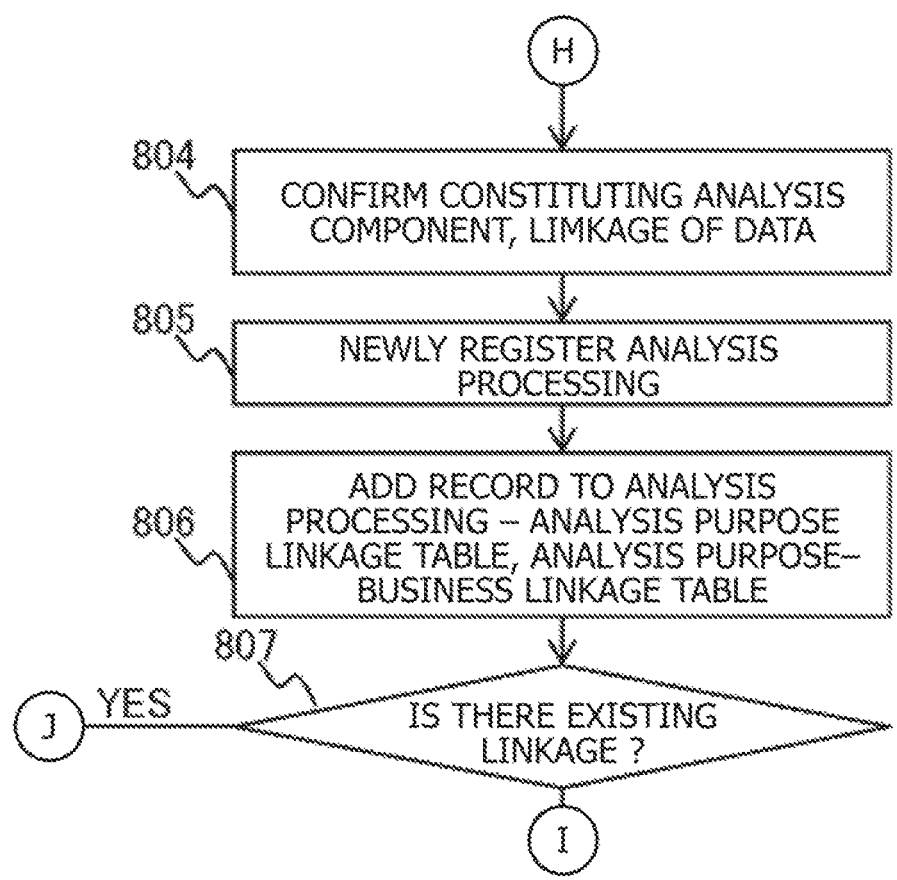
Figure 10C:
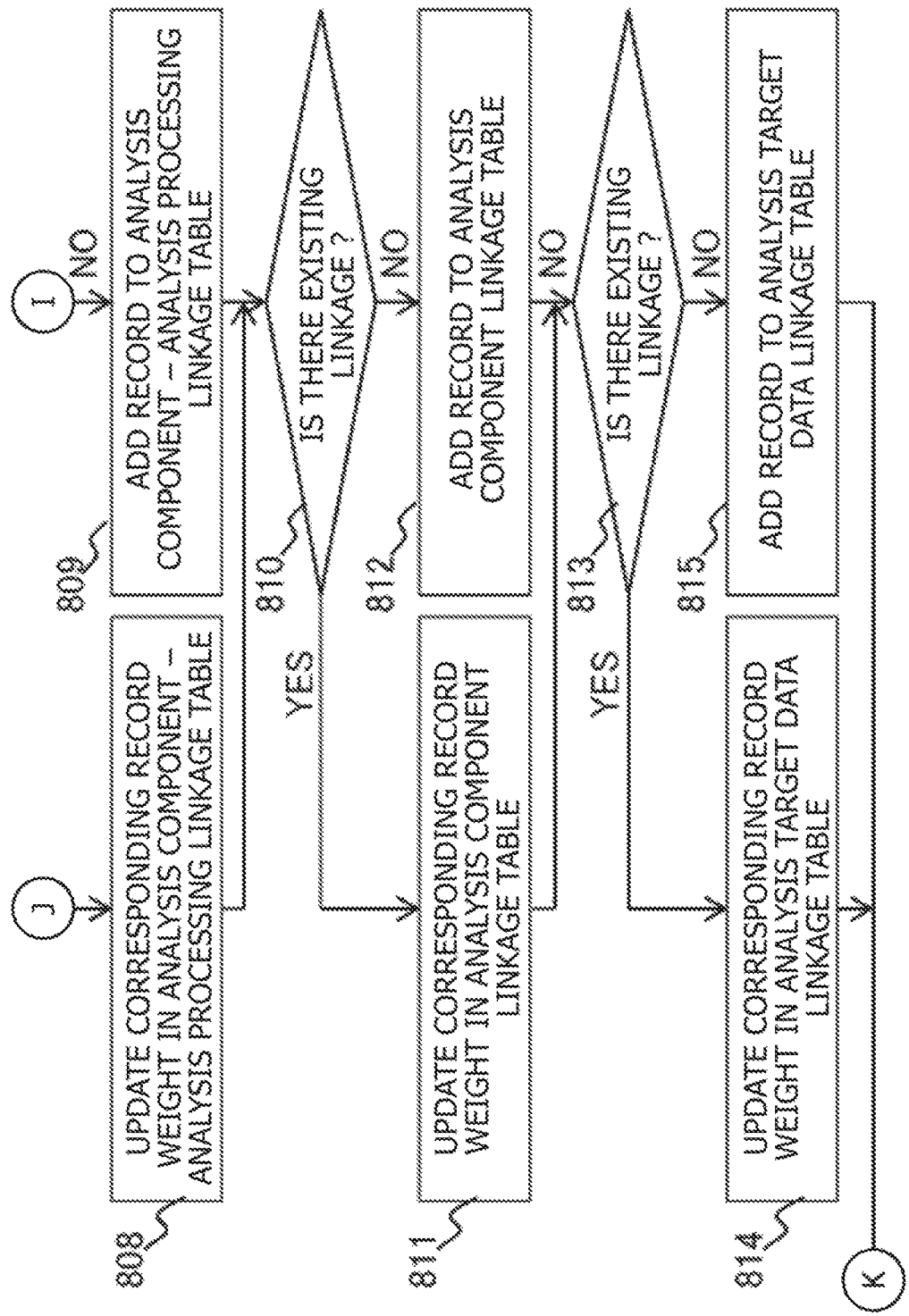
Figure 10D:
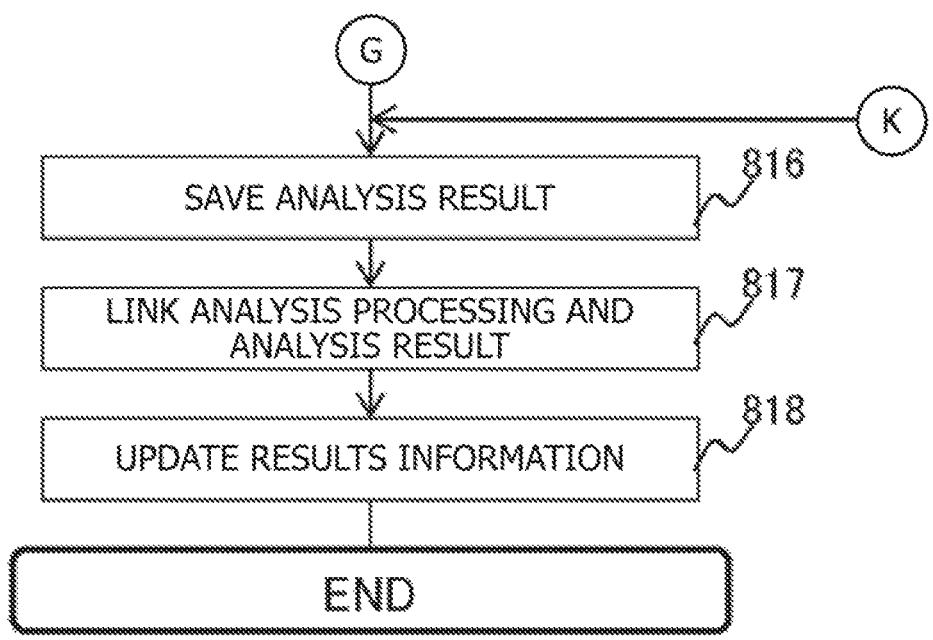

FIGS. 9A to 9C are charts depicting a flow example of the analysis software managing method in the embodiment.

Specifically, FIGS. 9A to 9C are flow charts in accordance with which the data utilization platform server 101 generates the analysis relationship table 307 on the basis of predetermined data registered from the business system 30.

In this case, the data utilization platform server 101 accepts the data registration from the business system 30 (701). Here, the data accepted in registration is various kinds of pieces of business data which are held in the respective business system 30, the sensing data and the like.

In addition, the data utilization platform server 101 generates a data relationship for the registered data obtained in Step 701 described above (702). The processing of generating the data relationship may suitably adopt the existing technology. However, for example, processing or the like of causing pieces of data in which certain one or multiple attributes of the observation points, the time zone, the target and the like of the values are common to one another over the business systems 30 to correspond to one another can be supposed.

Subsequently, the data utilization platform server 101 generates data matching logic and meta information 507 with which one or more pieces of related data are extracted from the analysis target data DB 304 on the basis of the data relationship generated in Step 702 described above (703).

Processing of generating an SQL statement for calling the pieces of analysis target data represented by the data relationship described above from the corresponding table of the analysis target data DB 304 corresponds to the generation of the data matching logic. In addition, it is only necessary that the generation of the SQL statement adopts a technology such as setting the table as the calling target, the identification information of the data, and the like in a template of the SQL statement which the data utilization platform server 101 previously holds.

In addition, the generation of the meta information 507 becomes processing of reading the type such as the character string or the numeric value, the size, and the value such as the table name of the storage destination of the pieces of analysis target data represented by the data relationship described above from the respective pieces of analysis target data, and constructing these values, as the meta information 507, in the form of a table.

In addition, the data utilization platform server 101 refers to the meta information 507 of the data matching logic generated in Step 703 described above (704), and with respect to the linkage between the analysis target data and the data matching logic, adds the record to the analysis target data linkage table 501 (705).

Subsequently, the data utilization platform server 101 determines whether or not the processing is ended for all the data described in the meta information 507 of the data linkage logic. In the case where it becomes clear that the processing is not ended for all the data described in the meta information 507 of the data linkage logic (706: NO), the processing of Step 705 and Step 706 is repetitively executed.

On the other hand, in the case where it becomes clear in the determination of Step 706 that the processing is ended for all the data described in the meta information 507 of the data linkage logic (706: YES), the data utilization platform server 101 determines whether or not the processing is ended for all the data matching logic (707).

In the case where as a result of this determination, it becomes clear that the processing is not ended for all the data matching logic (707: NO), the data utilization platform server 101 repetitively executes the processing of Steps 704 to 706.

On the other hand, in the case where as a result of the determination described above, it becomes clear the processing is ended for all the data matching logic (707: YES), and it becomes clear that the processing is not ended for all the data relationships (708: NO), the data utilization platform server 101 repetitively executes the processing of Steps 703 to 707.

On the other hand, in the case where in Step 708 described above, it becomes clear that the processing is ended for all the data relationships (708: YES), the data utilization platform server 101 refers to the meta information 506 of the data analysis logic (709), and refers to the meta information 507 of the data matching logic (710).

Next, in the case where as a result of the reference in Step 709, 710 described above, there is no designation of the data item 562 in the meta information 506 of the data analysis logic (711: NO), the data utilization platform server 101 compares the meta information 506 of the data analysis logic, and the meta information 507 of the data matching logic each other (712) in type (563, 573).

Subsequently, in the case where as a result of the comparison in Step 712 described above, it becomes clear that the data which matches the data in the meta information 506 of the data analysis logic is all included in the meta information 507 of the data matching logic (713: YES), the data utilization platform server 101 adds the record as the linkage between the data matching logic and the data analysis logic to the analysis component linkage table 502 (714).

On the other hand, in the case where in Step 711 described above, it becomes clear that there is a designation of the data item 562 in the meta information 506 of the data analysis logic (711: YES), the data utilization platform server 101 compares the meta information 506 of the data analysis logic, and the meta information 507 of the data matching logic with each other (715) in the data item (562, 572).

Next, in the case where as a result of the comparison in Step 715 described above, the data which matches the data in the meta information 506 of the data analysis logic is all included in the meta information 507 of the data matching logic (716: YES), the data utilization platform server 101 adds the record as the linkage between the data matching logic and the data analysis logic to the analysis component linkage table 502 (717).

In addition, the data utilization platform server 101 determines whether or not the data corresponding to the data the kind 564 of which is a "key" in the meta information 506 of the data analysis logic is included in the meta information 507 of the data matching logic linked in Step 717 described above (718).

In the case where as a result of the determination, it becomes clear that the data corresponding to the data as the "key" is not included (718: NO), the data utilization platform server 101 refers to the data relationship from the data the kind 564 of which is "input" in the meta information 506 of the data analysis logic to retrieve the data corresponding to the "key" (719).

In addition, the data utilization platform server 101 adds the record as the linkage with the data retrieved in Step 719 described above to the analysis target data linkage table 501 (720). Next, the data utilization platform server 101 determines whether or not the processing is ended for all the data matching logics (721). In the case where as a result of this determination, it becomes clear that the processing is not ended for all the data matching logics (721: NO), the data utilization platform server 101 repetitively executes the processing of Steps 710 to 720.

On the other hand, in the case where in Step 721 described above, it becomes clear that the processing is ended for all the data matching logics (721: YES), the data utilization platform server 101 determines whether or not the processing is ended for all the data analysis logics (722).

In the case where as a result of this determination, it becomes clear that the processing is not ended for all the data analysis logics (722: NO), the data utilization platform server 101 repetitively executes the processing of Steps 709 to 721. On the other hand, in the case where it becomes clear that the processing is ended for all the data analysis logics (722: YES), the data utilization platform server 101 ends the processing.

FIGS. 10A to 10D are charts depicting a flow example 2 of the analysis software managing method in the embodiment. Specifically, FIGS. 10A to 10D are flow charts depicting a flow of updating the analysis relationship table 307 on the basis of the results of the execution of the analysis processing.

Firstly, the data utilization platform server 101 confirms execution or non-execution of the registration of the information associated with analysis processing (the combination of the analysis components) executed by the analysis 201 in the analysis relationship table 307 (801). It should be noted that the fact that the analysis processing is even executed by the analyst 201, for example, can be detected through the record registration even in the analysis result DB 305.

Subsequently, in the case where as a result of Step 801, the registration of the analysis processing in the analysis relationship table 307 is confirmed (802: YES), with respect to the corresponding analysis processing (and the analysis components constituting the corresponding analysis processing, the analysis target data and the like), the data utilization platform server 101 updates the information on the "weight" of each of the records linked with one another in the tables of the analysis relationship table 307 (803). In this updating, for example, the value of the "weight" is incremented.

On the other hand, in the case where as a result of Step 801, it may be impossible to confirm the registration of the analysis processing in the analysis relationship table 307 (802: NO), the data utilization platform server 101 confirms the linkage among the analysis components constituting the executed analysis processing described above, and among the pieces of the analysis target data on the basis of the information on the analysis processing (804).

Next, the data utilization platform server 101 newly registers the information on the executed analysis processing described above in the analysis relationship table 307 (805). In addition, the data utilization platform server 101 adds the record as the information on the executed analysis processing described above to each of the analysis processing—analysis purpose linkage table 504 and the analysis purpose—business linkage table 505 (806).

In addition, the data utilization platform server 101 determines whether or not the corresponding existing linked record is present in the analysis components—analysis processing linkage table 503 (807). In the case where as a result of this determination, it becomes clear that there is a corresponding existing linkage record in the analysis component—analysis processing linkage table 503 (807: YES), the data utilization platform server 101 updates the information on the weight of the corresponding record in the analysis component—analysis processing linkage table 503 (807: YES) (808).

Subsequently, in the case where as a result of the determination of 807 described above, it becomes clear that there is no corresponding existing linkage record in the analysis component—analysis processing linkage table 503 (807: NO), the data utilization platform server 101 adds the record associated with the linkage in the executed analysis processing described above to the analysis component—analysis processing linkage table 503 (809).

In addition, the data utilization platform server 101 determines whether or not there is a corresponding existing linkage record in the analysis component linkage table 502 (810). In the case where as a result of this determination, it becomes clear that there is a corresponding existing linkage record in the analysis component linkage table 502 (810: YES), the data utilization platform server 101 updates the information on the weight of the corresponding record in the analysis component linkage table 502 (811).

On the other hand, in the case where as a result of the determination in Step 810 described above, there is no corresponding existing linkage record in the analysis component linkage table 502 (810: NO), the data utilization platform server 101 adds the record associated with the linkage in the executed analysis processing described above to the analysis component linkage table 502 (812).

Subsequently, the data utilization platform server 101 determines whether or not there is a corresponding existing linkage record in the analysis target data linkage table 501 (813). In the case where as a result of this determination, it becomes clear that there is a corresponding existing linkage record in the analysis target data linkage table 501 (813: YES), the data utilization platform server 101 updates the information on the weight of the corresponding record in the analysis target data linkage table 501 (814).

On the other hand, in the case where as a result of the determination in Step 813 described above, it becomes clear that there is no corresponding existing linkage record in the analysis target data linkage table 501 (813: NO), the data utilization platform server 101 adds the record associated with the linkage in the executed analysis processing described above to the analysis target data linkage table 501 (815).

Next, the data utilization platform server 101 links the analysis result (the data value outputted as the result of the execution of the analysis processing. For example, the value of KPI) of the executed analysis processing described above with the executed analysis processing described above and stores the linkage result in the analysis result DB 305 (816, 817).

In addition, the data utilization platform server 101, with respect to the executed analysis processing described above, updates the results information in the results information DB 06 (818). Specifically, the data utilization platform server 101 updates the values such as the frequency of execution, the number of users, the number of routine registrations, and the number of corrections in the analysis processing of interest.

Figure 11A:
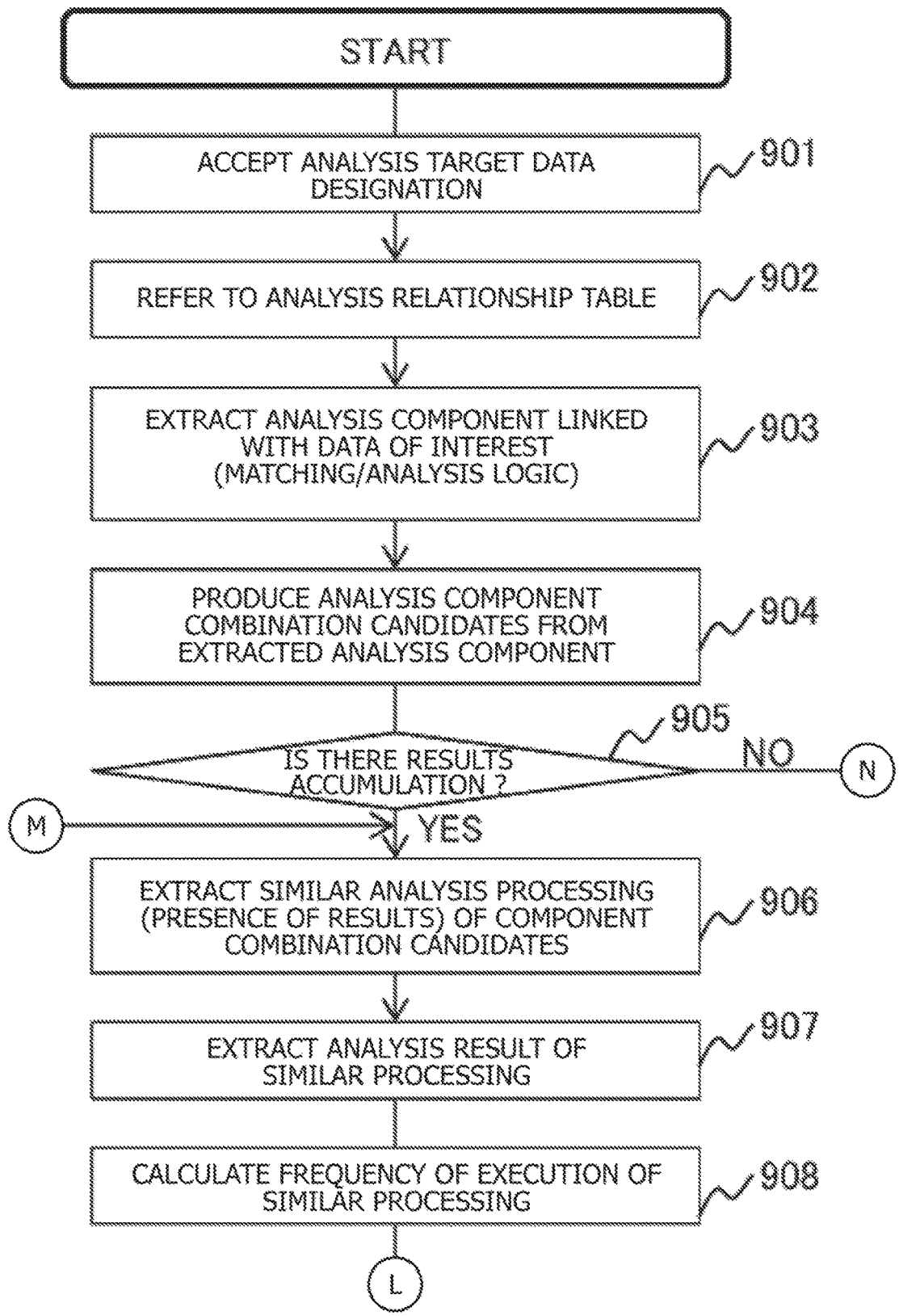

FIGS. 11A and 11B are charts depicting a flow example 3 of the analysis software managing method in the embodiment. Specifically, FIGS. 11A and 11B are flow charts depicting a flow of processing of referring to the analysis relationship table 307 by the data utilization platform server 101 to select and present the combination of the suitable analysis components for performing the analysis for the analysis target data of the user designation.

In this case, the data utilization platform server 101 accepts the designation of the analysis target data from the user through the user terminal 20 (901).

In addition, the data utilization platform server 101 refers to the analysis relationship table 307 (902), extracts the analysis components (the data matching logic, the data analysis logic) linked with the analysis target data of the user destination described above (903), and produces the analysis component combination candidates (904). The candidates form the list of the analysis components which can be extracted in Step 903.

Subsequently, the data utilization platform server 101 determines whether or not there is accumulation of the results information in the results information DB 306 with respect to the analysis component combination candidates described above (905).

In the case where as a result of the determination described above, it becomes clear that there is no accumulation of the results information in the results information DB 306 with respect to the analysis component combination candidates described above (905: NO), the data utilization platform server 101 does not execute the processing of Steps 906 to 913, and causes the processing to make transition to Step 914.

On the other hand, in the case where in Step 905 described above, it becomes clear that there is an accumulation of the results information in the results information DB 306 (905: YES), the data utilization platform server 101 extracts the existing analysis processing the accumulation of the results information, of which is present in the results information DB 306, which is similar to the produced analysis component candidates described above (906). It should be noted that the details of this processing will be described later with reference to FIGS. 12A to 12C.

Subsequently, the data utilization platform server 101 extracts the analysis result of the similar processing executed in Step 906 from the analysis result DB 305 (907). The analysis result is one for being presented as the associated information to the user.

Next, the data utilization platform server 101 calculates the frequency of execution of the similar processing described above by referring to the results information DB 306 (908). In addition, the data utilization platform server 101 calculates the number of users of the similar processing described above by referring to the results information DB 306 (909).

In addition, the data utilization platform server 101 calculates the number of registrations as the routine business of the similar processing described above by referring to the results information DB 306 (910).

In addition, the data utilization platform server 101 calculates the number of corrections of the similar processing described above by referring to the results information DB 306 (911). In addition, the data utilization platform server 101 calculates the number of similar processing of the similar processing described above by referring to the analysis relationship table 307 (912).

Subsequently, the data utilization platform server 101 determines the usefulness of the combination of the analysis components by using the results from Steps 907 to 912 described above (913). In this case, point calculation or the like by weighted addition is performed for the results of Steps 908 to 912 described above.

In addition, the data utilization platform server 101 determines whether or not the processing is ended for all the analysis component combination candidates (914). In this case where as a result of this determination, it becomes clear that the processing is not ended for all the analysis component combination candidates (914: NO), the data utilization platform server 101 repetitively executes the processing of Steps 906 to 913.

On the other hand, in the case where as a result of the determination described above, it becomes clear that the processing is ended for all the analysis component combination candidates (914: YES), the data utilization platform server 101 outputs the analysis result of the analysis component combination candidates, the usefulness determination result and the similar processing as the result of the processing to the user terminal 20 (915) to present the analysis result to the user.

Figure 12A:
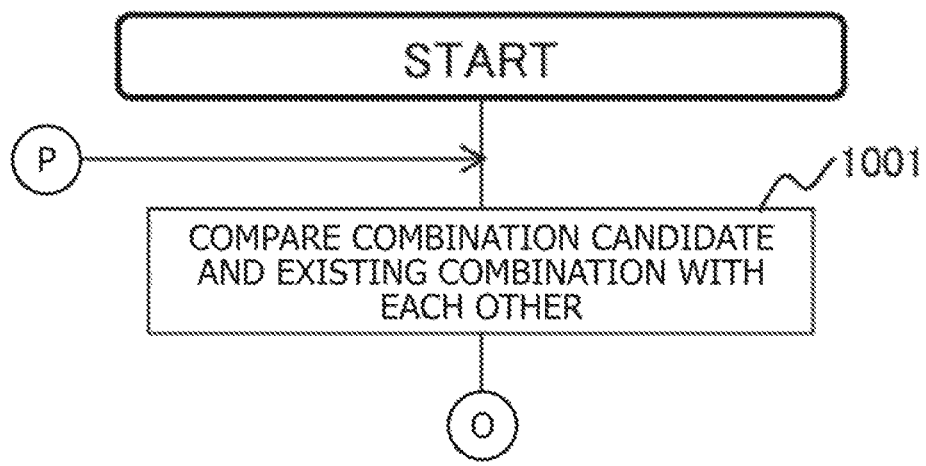
FIGS. 12A to 12C are flow charts depicting a flow example 4 of the analysis software managing method in the embodiment.
Figure 12B:
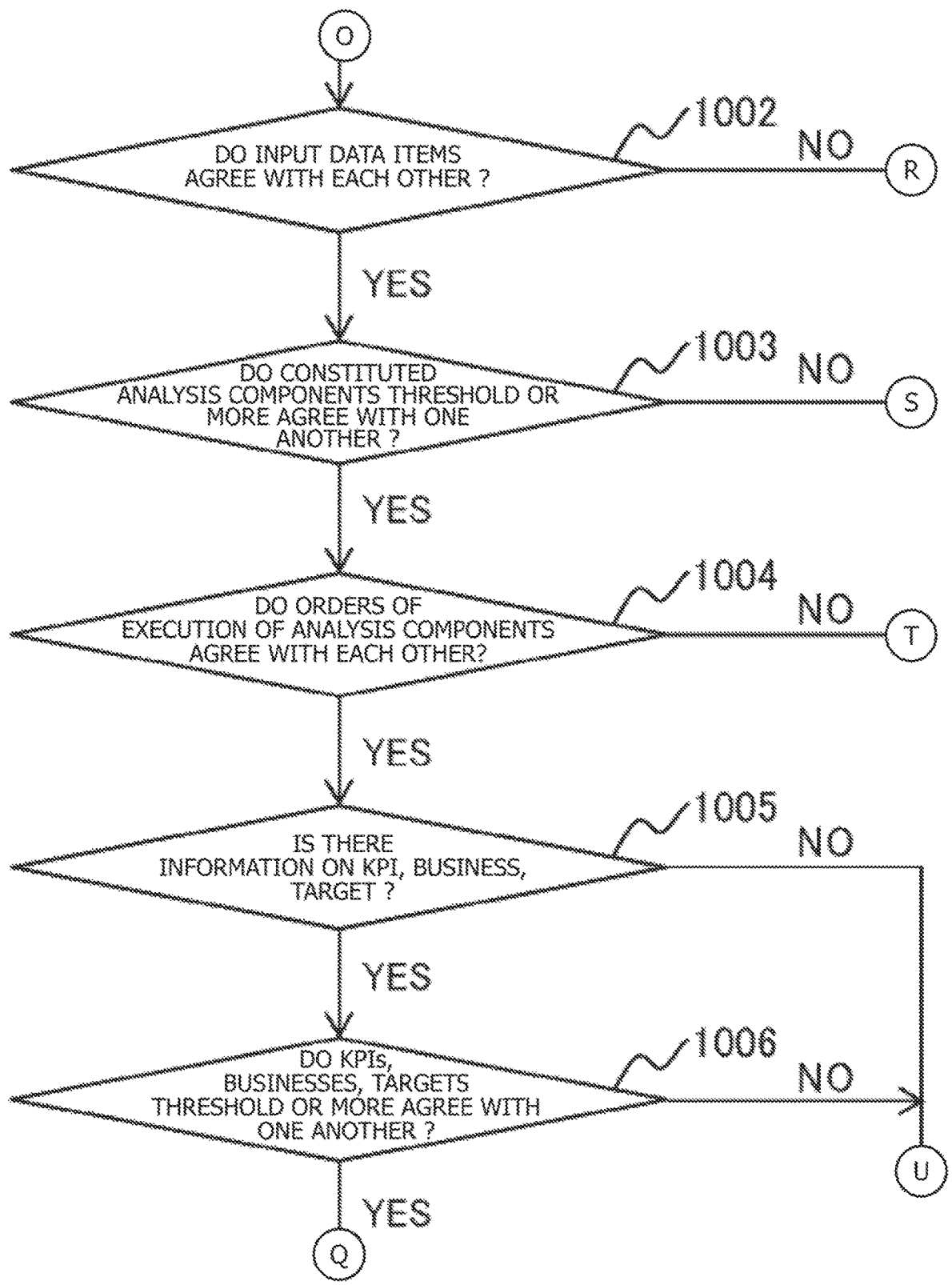
Figure 12C:
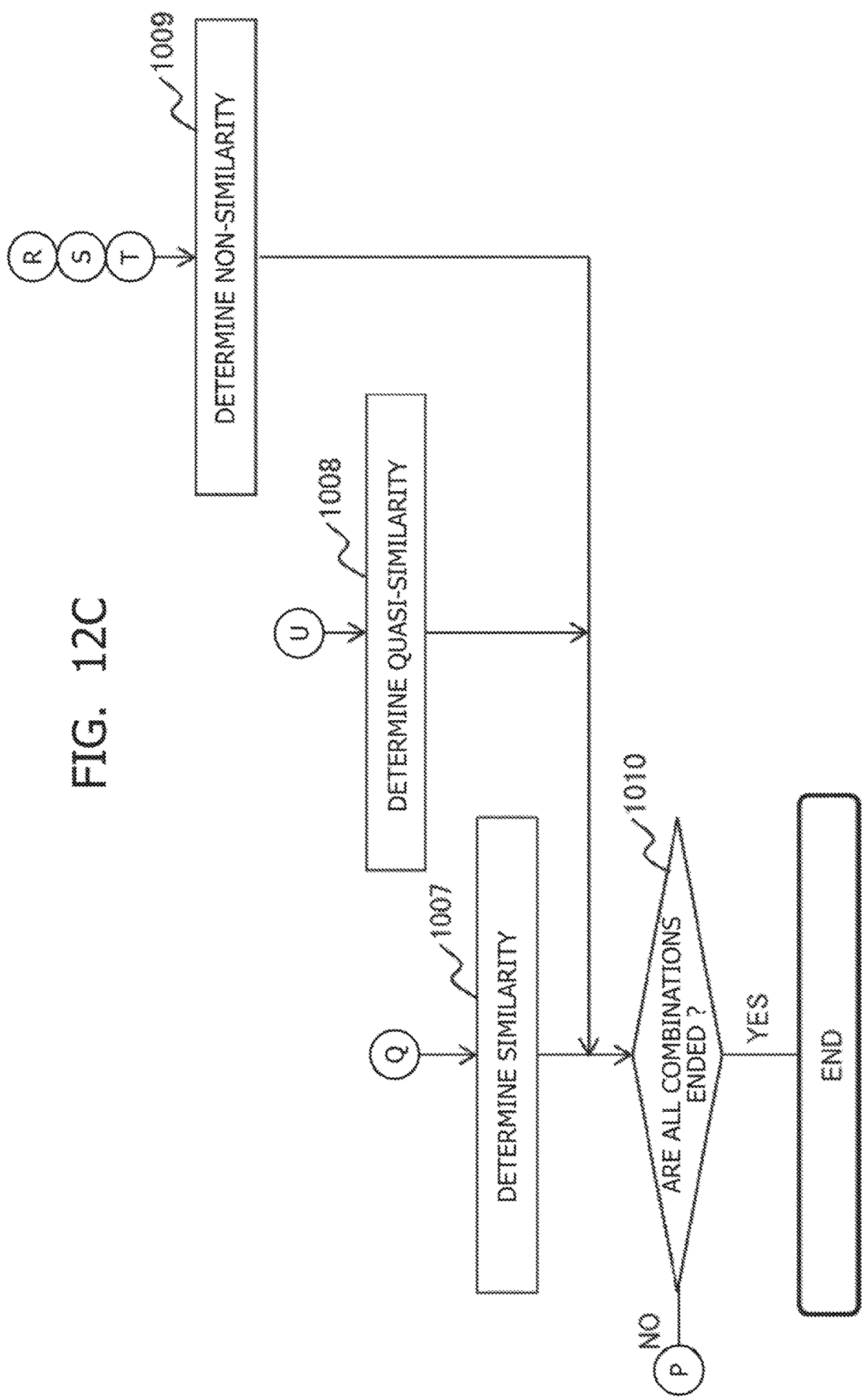

FIGS. 12A to 12C are charts depicting a flow example 4 of the analysis software managing method in the embodiment. Specifically, FIGS. 12A to 12C are flow charts in which the data utilization platform server 101 selects the similar existing analysis processing, when the combination of the suitable analysis components is selected for performing the analysis for the analysis target data of the user designation.

In this case, the data utilization platform server 101 compares the combination candidates of the analysis component for the designated analysis target data selected in the flows of FIGS. 11A and 11B, and the existing analysis component combinations accumulated as the results of the analysis processing with each other by referring to the analysis relationship table 307 (1001). Next, the data utilization platform server 101 determines whether or not the analysis component combination candidates described above, and the existing analysis component combinations agree in input data item with each other (1002).

In the case where as a result of this determination, it becomes clear that the analysis component combination candidates described above, and the existing analysis component combinations do not agree in input data items with each other (1002: NO), the data utilization platform server 101 determines that both the combinations are not similar to each other (1009), and causes the processing to make transition to Step 1010.

On the other hand, in the case where as a result of the determination described above, it becomes clear that the analysis component combination candidates described above, and the existing analysis component combinations agree in input data item with each other (1002: YES), the data utilization platform server 101 determines whether or not the number of analysis components constituted by the analysis component combination candidates and the existing analysis component combination agreeing in kind with each other is equal to or larger than a designated threshold value (1003).

In the case where as a result of the determination described above, it becomes clear that the number by which the kinds of the analysis components agree with each other is not equal to or larger than the designated threshold value (1003: NO), the data utilization platform server 101 determines that both the combinations are not similar to each other (1009), and causes the processing to make transition to Step 1010.

On the other hand, in the case where as a result of the determination described above, it becomes clear that the number by which the kinds of the analysis components agree with each other is equal to or larger than the designated threshold value (1003: YES), the data utilization platform server 101 determines whether or not the orders of execution of the analysis components constituted by the analysis component combination candidates and the existing analysis component candidates agree with each other (1004).

In the case where as a result of the determination described above, it becomes clear that the orders of the execution of the analysis components do not agree with each other (1004: NO), the data utilization platform server 101 determines that both the combinations are not similar to each other (1009), and causes the processing to make transition to Step 1010.

On the other hand, in the case where as a result of the determination described above, it becomes clear that the orders of the execution of the analysis components agree with each other (1004: YES), the data utilization platform server 101 determines whether or not there is information on the KPI, the business, and the target as the analysis relationship information (1005).

In the case where as a result of this determination, it becomes clear that there is not the information on the KPI, the business, and the target (1005: NO), the data utilization platform server 101 determines that both the combinations show the quasi-similarity in which only parts thereof agree with each other (1008), and causes the processing to make transition to Step 1010.

On the other hand, in the case where as a result of the determination, it becomes clear that there is information on the KPI, the business, and the target (1005: YES), the data utilization platform server 101 determines whether or not the number by which with respect to the analysis component combination candidate and the existing analysis component combination, the KPIs, the business, and the targets is equal to or larger than a designated threshold value (1006).

In the case where as a result of the determination described above, it becomes clear that the number by which the KPIs, the businesses, and the targets agree with each other is not equal to or larger than the designated threshold value (1006: NO), the data utilization platform server 101 determines that both the combinations show the quasi-similarity in which only parts thereof agree with each other (1008), and causes the processing to make transition to Step 1010.

On the other hand, in the case where as a result of the determination described above, the number by which the KPIs, the businesses, and the targets agree with each other is equal to or larger than the designated threshold value (1006: YES), the data utilization platform server 101 determines that both the combinations are similar to each other (1007), and causes the processing to make transition to Step 1010.

Next, the data utilization platform server 101 determines whether or not the comparison is ended for all the analysis component combination candidates and existing analysis component combinations (1010). In the case where as a result of this determination, it becomes clear that the comparison is not ended for all the analysis component combination candidates and existing analysis component combinations (1010: NO), the data utilization platform server 101 repetitively executes the processing of Steps 1001 to 1009 described above.

On the other hand, in the case where as a result of the determination described above, it becomes clear that the comparison is not ended for all the analysis component combination candidates and existing analysis component combinations (1010: NO), the data utilization platform server 101 ends the processing.

Figure 13:
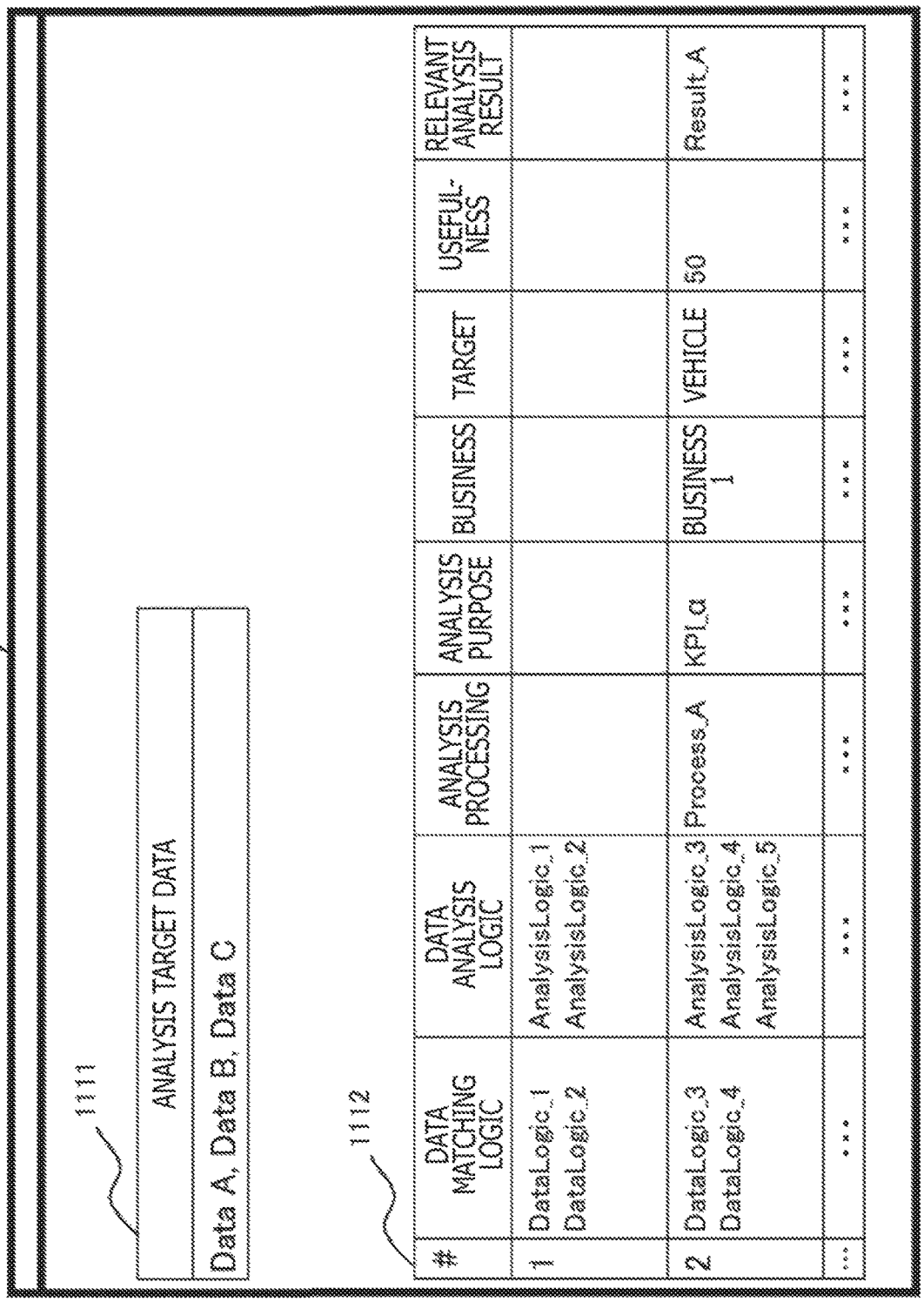
FIG. 13 is a diagram depicting a picture image example in the embodiment.

FIG. 13 is an example of an output picture in the embodiment. Specifically, FIG. 13 is an example of a confirmation picture of the combination candidates of the analysis components suitable for the execution of the analysis for the analysis target data (the data selected by the user) which is presented to the user through the user terminal 20 in Step 915 described above.

A picture 1101 exemplified in FIG. 13, for example, includes an analysis target data column 1111 and a candidate display column 1112 in each of which the analysis target data designated by the user is displayed.

Of them, the combination of the data matching logic and the data analysis logic which becomes candidates of the analysis processing for the analysis target data of the user designation, and the analysis processing, the analysis purpose, the business, the target which are associated with the combination, and the usefulness of the combination and the associated analysis result (the ID of the corresponding record in the analysis result DB 305 of FIG. 7B) are displayed as a list in the candidate display column 1112. It should be noted that in the case where there is no corresponding information, the display is performed including a blank.

Although the best mode for carrying out the present invention or the like has been concretely described so far, the present invention is by no means limited thereto, and various changes can be made without departing from the subject matter.

According to such an embodiment, in the system for presenting the data to the application performing the use and application of the data such as the data analysis, the component reusable for the production of the analysis processing can be presented even from a time point of introduction of the system of interest, and a time point of start of the operation can be presented. As a result, for example, the speed-up of the work of the production and preparation of the analysis application for analyzing the data from a plurality of business systems are enabled. As a result, the cost required for implementation of the use and application of the data including the data analysis processing can be reduced.

That is to say, the proposal of the data analysis components is enabled to be performed irrespective of the quantity of the implementation history of the data analysis, and thus the efficiency and cost reduction of production of the software for data analysis can be promoted.

The description of the present specification causes at least the following matters to prove. That is to say, in the analysis software managing system of the embodiment, the arithmetic device may make a correlation among a plurality of pieces of analysis target data with one in response to the relationship among the pieces of analysis target data based on the attributes of the pieces of analysis target data in the processing of generating the analysis relationship information, and may generate the data matching logic for extracting the plurality of analysis target data during the analysis as one of the analysis components in accordance with the predetermined algorithm.

According to this, the data kinds obtained from the various business systems or the like can be subjected to the grouping on the basis of the suitable attributes, and can efficiently make available for the analysis.

In addition, in the analysis software managing system of the embodiment, the arithmetic device may link the data matching logic, and the data analysis logic for executing the analysis processing for the analysis target data extracted by the data matching logic as one of the analysis components with each other in the processing of generating the analysis relationship information by comparing the meta information associated with the pieces of handling data of the data matching logic and the data analysis logic.

According to this, the data matching logic and the data analysis logic constituting the analysis component can be accurately linked with each other on the basis of the adaption of the data items or the like handled by the data matching logic and the data analysis logic, and the analysis component can be efficiently proposed.

In addition, in the analysis software managing system of the embodiment, the arithmetic device may further execute the processing of updating the analysis relationship information on the basis of the results information of the analysis processing by the analysis component.

According to this, of the analysis components which are presented to the user, with respect to the analysis components which the user actually selects and utilizes, the information for recognizing the usefulness thereof can be managed, and thus the subsequent specific accuracy of the combination of the analysis components can be made more suitable.

In addition, in the analysis software managing system of the embodiment, in updating the analysis relationship information, the arithmetic device may link the analysis processing with at least any information of the purpose of the analysis processing of interest, the business corresponding to the purpose of interest, and the target of the business of interest.

According to this, of the analysis components which are presented to the user, with respect to the analysis components which the user actually selects and utilizes, the information for recognizing the usefulness based on the concrete situation such as the purpose, the business, and the target of the business can be managed, and thus the subsequent specific accuracy of the combination of the analysis components can be made more suitable.

In addition, in the analysis software managing system of the embodiment, in the case where the arithmetic device has the results information of the analysis processing by the analysis components in the processing of specifying the combination of the analysis components, the arithmetic device may specify the combination of the analysis components on the basis of the results information as well.

According to this, the specific accuracy of the combination of the analysis components can be made more suitable.

In addition, in the analysis software managing system of the embodiment, the arithmetic device may further execute the processing of specifying the analysis processing similar to the combination of the specified analysis components on the basis of the results information of the analysis processing by the analysis components, and determining the usefulness of the combination of the specified analysis components on the basis of the results value of the frequency of generation of the predetermined event with respect to the analysis processing for the similarity.

According to this, the specific accuracy of the combination of the analysis components can be made further suitable on the basis of the frequency of generation of the event in which the usefulness of the analysis components, of the analysis components presented to the user, such as the event which actually the user selects and utilizes, can be recognized.

In addition, in the analysis software managing system of the embodiment, the arithmetic device may further execute the processing of outputting the information associated with the combination of the specified analysis components as the information associated with the combination candidates of the analysis components suitable for the analysis of the predetermined data designated as the analysis target to a predetermined apparatus.

According to this, the information of the analysis components suitable for the analysis of the analysis target data can be presented to the user.

In addition, in the analysis software managing method of the embodiment, the information processing system may generate the data matching logic for relating a plurality of pieces of analysis target data in response to the relationship between the pieces of analysis target data based on the attributes of the pieces of analysis target data to one another in the processing of generating the analysis relationship information, and extracting the plurality of pieces of analysis target data during the analysis in the form of one of the analysis components in accordance with a predetermined algorithm.

In addition, in the analysis software managing method of the embodiment, the information processing system may link the data matching logic, and the data analysis logic, as one of the analysis components, for executing the analysis processing for the analysis target data extracted by the data matching logic with each other in the processing of generating the analysis relationship information by comparing the pieces of meta information with respect to the pieces of handling data of the data matching logic and the data analysis logic.

In addition, in the analysis software managing method of the embodiment, the information processing system may further execute the processing of updating the analysis relationship information on the basis of the results information of the analysis processing by the analysis components.

In addition, in the analysis software managing method of the embodiment, the information processing system may link the analysis processing, and at least one piece of information of the purpose of the analysis processing of interest, the business corresponding to the purpose of interest, and the target of the business of interest in updating the analysis relationship information.

In addition, in the analysis software managing method of the embodiment, in the case where the information processing system has the results information of the analysis processing by the analysis components in the processing of specifying the combination of the analysis components, the information processing system may specify the combination of the analysis components on the basis of the results information as well.

In addition, in the analysis software managing method of the embodiment, the information processing system may further execute the processing of specifying the analysis processing similar to the combination of the specified analysis components on the basis of the results information of the analysis processing by the analysis components, and determining the usefulness of the combination of the specified analysis components on the basis of the results value of the frequency of generation of the predetermined event with respect to the similar analysis processing.

In addition, in the analysis software managing method of the embodiment, the information processing system may further execute the processing of outputting the information associated with the combination of the specified analysis components as the combination candidate of the analysis component suitable for the analysis of the predetermined data designated as the analysis target to a predetermined apparatus.

DESCRIPTION OF REFERENCE CHARACTERS

10, 11: Network
20: User terminal
30: Business system
101: Data utilization platform server 101 (analysis software managing system)

111, 121: Storage device
112, 122: Arithmetic device
113, 123: Communication device
300: Middleware for data utilization
301: Analysis execution managing section
302: Analysis processing
303: Analysis component
304: Analysis target data DB
305: Analysis result DB
306: Results information DB
307: Analysis relationship table
308: Analysis relationship information managing section
309: Analysis proposing section
310: User and business managing section
311: client I/F providing section
312: Analysis processing results managing section
313: Analysis component managing section
314: Data managing section
315: Data communicating section
401: Analysis relationship information
421: Data matching logic
422: Data analysis logic
501: Analysis target data linkage table
502: Analysis component linkage table
503: Analysis component—analysis processing linkage table
504: Analysis processing—analysis purpose linkage table
505: Analysis purpose—business linkage table
506: Meta information of data analysis logic
507: Meta information of data matching logic

The invention claimed is:

1. An analysis software managing system comprising:
a storage device to store analysis target data collected from a plurality of predetermined systems and a program; and
an arithmetic device, including a processor executing the program to cause the arithmetic device to execute:
processing of generating analysis relationship information by specifying, in regards to a relationship among the pieces of the analysis target data stored in the storage device, as information of a data relationship that relates the analysis target data with common attributes of values to one another over the plurality of predetermined systems;
processing of generating a Structured Query Language (SQL) statement for calling the pieces of analysis target data represented by the information of the data relationship from a storage destination of the storage device as data matching logic;
processing of storing in the storage device a linkage between each of the analysis target data and the data matching logic that is an analysis component for extracting the analysis target data to be analyzed at a time of analysis in generating the analysis relation information; and
processing of specifying a combination of a plurality of the analysis components available for predetermined data designated as an analysis target by a user based on the analysis relationship information,
wherein the arithmetic device further executes linking the data matching logic and a data analysis logic for executing analysis processing for analysis target data that is one of the analysis components and that is extracted by the data matching logic with each other by comparing meta information associated with pieces of handling data of the data matching logic and the data analysis logic with each other, in the processing of generating the analysis relationship information.

2. The analysis software managing system according to claim 1, wherein
the arithmetic device further executes processing of updating the analysis relationship information based on results information of analysis processing by the analysis component.

3. The analysis software managing system according to claim 2, wherein
the arithmetic device further executes linking the analysis processing, and at least any pieces of information of a purpose of the analysis processing, a business corresponding to the purpose, and a target of the business with each other in updating the analysis relationship information.

4. The analysis software managing system according to claim 1, wherein
in a case where the arithmetic device further executes, based on results information of the analysis processing by the analysis component, specifying a combination of the analysis components based on the results information as well in the processing of specifying the combination of the analysis components.

5. The analysis software managing system according to claim 1, wherein
the arithmetic device further executes processing of specifying analysis processing similar to the combination of the specified analysis components based on results information of the analysis processing by the analysis component, and determining usefulness of the combination of the specified analysis components based on a results value of a frequency of generation of a predetermined event related to the similar analysis processing.

6. The analysis software managing system according to claim 1, wherein
the arithmetic device further executes processing of outputting information associated with the combination of the specified analysis components as information associated with a combination candidate of the analysis components suitable for analysis of predetermined data designated as the analysis target to a predetermined apparatus.

7. An analysis software managing method in an information processing system having a storage device which stores analysis target data collected from a plurality of predetermined systems, the method comprising the steps of:
generating analysis relationship information by specifying, in regards to a relationship among the pieces of the analysis target data stored in the storage device, as information of a data relationship that relates the analysis target data with common attributes of values to one another over the plurality of predetermined systems;
generating Structured Query Language (SQL) statement for calling the pieces of analysis target data represented by the information of the data relationship from a storage destination of the storage device as data matching logic;
storing in the storage device a linkage between each of the analysis target data and the data matching logic that is an analysis component for extracting the analysis target data to be analyzed at a time of analysis and generating the analysis relation information; and
specifying a combination of a plurality of the analysis components available for predetermined data designated as an analysis target by a user based on the analysis relationship information, wherein the information processing system links the data matching logic and a data analysis logic for executing analysis proceeding for analysis target data that is one of the analysis components and that is extracted by the data matching logic with each other by comparing meta information associated with pieces of handling data of the data matching logic and the data analysis logic with each other, in the processing of generating the analysis relationship information.

8. The analysis software managing method according to claim 7, wherein the information processing system further executes processing of updating the analysis relationship information based on results information of analysis processing by the analysis component.

9. The analysis software managing method according to claim 8, wherein the information processing system links the analysis processing, and at least any pieces of information of a purpose of the analysis processing, a business corresponding to the purpose, and a target of the business with each other in updating the analysis relationship information.

10. The analysis software managing method according to claim 7, wherein in a case where the information processing system has results information of the analysis processing by the analysis component, the information processing system specifies a combination of the analysis components based on the results information as well in the processing of specifying the combination of the analysis components.

11. The analysis software managing method according to claim 7, wherein the information processing system further executes processing of specifying analysis processing similar to the combination of the specified analysis components based on results information of the analysis processing by the analysis component and determining usefulness of the combination of the specified analysis components based on a results value of a frequency of generation of a predetermined event related to the similar analysis processing.

12. The analysis software managing method according to claim 7, wherein the information processing system further executes processing of outputting information associated with the combination of the specified analysis components as information associated with a combination candidate of the analysis components suitable for analysis of predetermined data designated as the analysis target to a predetermined apparatus.

\* \* \* \* \*